(12) United States Patent  
Inoue et al.

(10) Patent No.: US 8,518,513 B2  
(45) Date of Patent: *Aug. 27, 2013

(54) MULTILAYER OPTICAL RECORDING MEDIUM

(75) Inventors: Motohiro Inoue, Tokyo (JP); Takashi Kikukawa, Tokyo (JP); Atsuko Kosuda, Tokyo (JP); Tomoki Ushida, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,458

(22) Filed: Oct. 20, 2011

(65) Prior Publication Data

US 2012/0102509 A1    Apr. 26, 2012

(30) Foreign Application Priority Data

Oct. 21, 2010   (JP) ................................. 2010-236073

(51) Int. Cl.
    *G11B 7/24*    (2013.01)
(52) U.S. Cl.
    USPC ..................... 428/64.1; 428/64.4; 430/270.11
(58) Field of Classification Search
    USPC ....................................................... 428/64.4
    See application file for complete search history.

(56) References Cited

U.S. PATENT DOCUMENTS

2011/0206889 A1*  8/2011  Mitsumori et al. .......... 428/64.4

OTHER PUBLICATIONS

Mishima et al., "150 GB, 6-lalyer write once disc for Blue-ray Disc system", Proc of SPIE 6282, 6280I (2006).
Ichimura et al., "Proposal for a multilayer read-only-memory optical disk structure", Applied Optics 45(8):1794-1803 (2006).

* cited by examiner

*Primary Examiner* — Elizabeth Mulvaney
(74) *Attorney, Agent, or Firm* — Porzio, Bromberg & Newman, P.C.

(57) ABSTRACT

The multilayer optical recording medium with six or more recording and reading layers disposed one above the other has at least two or more recording and reading layer groups. The recording and reading layer groups each include a plurality of recording and reading layers successively disposed one above the other. The reflectance of each of the recording and reading layers in a stacked state decreases in the order from a front side near a light incident surface toward a back side far from the light incident surface. A recording and reading layer nearest the front side among the recording and reading layers in the recording and reading layer group nearer the back side has a reflectance in a stacked state higher than that of a recording and reading layer nearest the back side among the recording and reading layers in the recording and reading layer group nearer the front side.

20 Claims, 32 Drawing Sheets

| RECORDING LAYER | SINGLE-LAYER REFLECTANCE | STACKED-LAYER REFLECTANCE | SINGLE-LAYER ABSORPTANCE | STACKED-LAYER ABSORPTANCE |
|---|---|---|---|---|
| L0 | 1.90% | 0.55% | 6.50% | 3.49% |
| L1 | 1.90% | 0.66% | 6.50% | 3.82% |
| L2 | 1.90% | 0.79% | 6.50% | 4.18% |
| L3 | 1.90% | 0.94% | 6.50% | 4.57% |
| L4 | 1.10% | 0.61% | 4.48% | 3.34% |
| L5 | 1.10% | 0.69% | 4.48% | 3.54% |
| L6 | 1.10% | 0.77% | 4.48% | 3.75% |
| L7 | 1.10% | 0.87% | 4.48% | 3.98% |
| L8 | 1.10% | 0.98% | 4.48% | 4.22% |
| L9 | 1.10% | 1.10% | 4.48% | 4.48% |

FIG. 3C

| COMPONENT OF STACKED STRUCTURE | FILM THICKNESS OF INTERMEDIATE LAYER (μm) | DISTANCE FROM LIGHT INCIDENT SURFACE (μm) | RECORDING AND READING LAYER GROUP |
|---|---|---|---|
| L0 RECORDING AND READING LAYER 14A | | 174 | FIRST RECORDING AND READING LAYER GROUP 13A |
| FIRST INTERMEDIATE LAYER 16A | 12 | | |
| L1 RECORDING AND READING LAYER 14B | | 162 | |
| SECOND INTERMEDIATE LAYER 16B | 16 | | |
| L2 RECORDING AND READING LAYER 14C | | 146 | |
| THIRD INTERMEDIATE LAYER 16C | 12 | | |
| L3 RECORDING AND READING LAYER 14D | | 134 | |
| FOURTH INTERMEDIATE LAYER 16D | 16 | | |
| L4 RECORDING AND READING LAYER 14E | | 118 | |
| FIFTH INTERMEDIATE LAYER 16E | 12 | | |
| L5 RECORDING AND READING LAYER 14F | | 106 | |
| SIXTH INTERMEDIATE LAYER 16F | 16 | | |
| L6 RECORDING AND READING LAYER 14G | | 90 | SECOND RECORDING AND READING LAYER GROUP 13B |
| SEVENTH INTERMEDIATE LAYER 16G | 12 | | |
| L7 RECORDING AND READING LAYER 14H | | 78 | |
| EIGHTH INTERMEDIATE LAYER 16H | 16 | | |
| L8 RECORDING AND READING LAYER 14I | | 62 | |
| NINTH INTERMEDIATE LAYER 16I | 12 | | |
| L9 RECORDING AND READING LAYER 14J | | 50 | |
| COVER LAYER | 50 | | |

FIG. 4

| COMPONENT OF STACKED STRUCTURE | FILM THICKNESS OF INTERMEDIATE LAYER (μm) | DISTANCE FROM LIGHT INCIDENT SURFACE (μm) | RECORDING AND READING LAYER GROUP |
|---|---|---|---|
| L0 RECORDING AND READING LAYER 114A | | 262 | FIRST RECORDING AND READING LAYER GROUP 113A |
| FIRST INTERMEDIATE LAYER 116A | 16 | | |
| L1 RECORDING AND READING LAYER 114B | | 246 | |
| SECOND INTERMEDIATE LAYER 116B | 12 | | |
| L2 RECORDING AND READING LAYER 114C | | 234 | |
| THIRD INTERMEDIATE LAYER 116C | 16 | | |
| L3 RECORDING AND READING LAYER 114D | | 218 | |
| FOURTH INTERMEDIATE LAYER 116D | 12 | | |
| L4 RECORDING AND READING LAYER 114E | | 206 | |
| FIFTH INTERMEDIATE LAYER 116E | 16 | | |
| L5 RECORDING AND READING LAYER 114F | | 190 | |
| SIXTH INTERMEDIATE LAYER 116F | 12 | | |
| L6 RECORDING AND READING LAYER 114G | | 178 | |
| SEVENTH INTERMEDIATE LAYER 116G | 16 | | |
| L7 RECORDING AND READING LAYER 114H | | 162 | SECOND RECORDING AND READING LAYER GROUP 113B |
| EIGHTH INTERMEDIATE LAYER 116H | 12 | | |
| L8 RECORDING AND READING LAYER 114I | | 150 | |
| NINTH INTERMEDIATE LAYER 116I | 16 | | |

FIG. 5

| COMPONENT OF STACKED STRUCTURE | FILM THICKNESS OF INTERMEDIATE LAYER (μm) | DISTANCE FROM LIGHT INCIDENT SURFACE (μm) | RECORDING AND READING LAYER GROUP |
|---|---|---|---|
| L9 RECORDING AND READING LAYER 114J | | 134 | |
| TENTH INTERMEDIATE LAYER 116J | 12 | | |
| L10 RECORDING AND READING LAYER 114K | | 122 | |
| ELEVENTH INTERMEDIATE LAYER 116K | 16 | | |
| L11 RECORDING AND READING LAYER 114L | | 106 | |
| TWELFTH INTERMEDIATE LAYER 116L | 12 | | SECOND RECORDING AND READING LAYER GROUP 113B |
| L12 RECORDING AND READING LAYER 114M | | 94 | |
| THIRTEENTH INTERMEDIATE LAYER 116M | 16 | | |
| L13 RECORDING AND READING LAYER 114N | | 78 | |
| FOURTEENTH INTERMEDIATE LAYER 116N | 12 | | |
| L14 RECORDING AND READING LAYER 114O | | 66 | |
| FIFTEENTH INTERMEDIATE LAYER 116O | 16 | | |
| L15 RECORDING AND READING LAYER 114P | | 50 | |
| COVER LAYER | 50 | | |

FIG. 5 (continued)

| RECORDING LAYER | SINGLE-LAYER REFLECTANCE | STACKED-LAYER REFLECTANCE | SINGLE-LAYER ABSORPTANCE | STACKED-LAYER ABSORPTANCE |
|---|---|---|---|---|
| L0 | 1.50% | 0.22% | 6.88% | 2.66% |
| L1 | 1.50% | 0.27% | 6.88% | 2.91% |
| L2 | 1.50% | 0.32% | 6.88% | 3.18% |
| L3 | 1.50% | 0.38% | 6.88% | 3.47% |
| L4 | 1.50% | 0.46% | 6.88% | 3.80% |
| L5 | 0.70% | 0.24% | 4.48% | 2.61% |
| L6 | 0.70% | 0.27% | 4.48% | 2.75% |
| L7 | 0.70% | 0.30% | 4.48% | 2.91% |
| L8 | 0.70% | 0.33% | 4.48% | 3.07% |
| L9 | 0.70% | 0.37% | 4.48% | 3.24% |
| L10 | 0.70% | 0.41% | 4.48% | 3.42% |
| L11 | 0.70% | 0.45% | 4.48% | 3.61% |
| L12 | 0.70% | 0.51% | 4.48% | 3.81% |
| L13 | 0.70% | 0.56% | 4.48% | 4.02% |
| L14 | 0.70% | 0.63% | 4.48% | 4.24% |
| L15 | 0.70% | 0.70% | 4.48% | 4.48% |

FIG. 6C

| COMPONENT OF STACKED STRUCTURE | FILM THICKNESS OF INTERMEDIATE LAYER (μm) | DISTANCE FROM LIGHT INCIDENT SURFACE (μm) | RECORDING AND READING LAYER GROUP |
|---|---|---|---|
| L0 RECORDING AND READING LAYER 214A | | 314 | |
| FIRST INTERMEDIATE LAYER 216A | 12 | | |
| L1 RECORDING AND READING LAYER 214B | | 302 | FIRST RECORDING AND READING LAYER GROUP 213A |
| SECOND INTERMEDIATE LAYER 216B | 16 | | |
| L2 RECORDING AND READING LAYER 214C | | 286 | |
| THIRD INTERMEDIATE LAYER 216C | 12 | | |
| L3 RECORDING AND READING LAYER 214D | | 274 | |
| FOURTH INTERMEDIATE LAYER 216D | 16 | | |
| L4 RECORDING AND READING LAYER 214E | | 258 | |
| FIFTH INTERMEDIATE LAYER 216E | 12 | | |
| L5 RECORDING AND READING LAYER 214F | | 246 | |
| SIXTH INTERMEDIATE LAYER 216F | 16 | | |
| L6 RECORDING AND READING LAYER 214G | | 230 | |
| SEVENTH INTERMEDIATE LAYER 216G | 12 | | |
| L7 RECORDING AND READING LAYER 214H | | 218 | |
| EIGHTH INTERMEDIATE LAYER 216H | 16 | | SECOND RECORDING AND READING LAYER GROUP 213B |
| L8 RECORDING AND READING LAYER 214I | | 202 | |
| NINTH INTERMEDIATE LAYER 216I | 12 | | |
| L9 RECORDING AND READING LAYER 214J | | 190 | |
| TENTH INTERMEDIATE LAYER 216J | 16 | | |
| L10 RECORDING AND READING LAYER 214K | | 174 | |
| ELEVENTH INTERMEDIATE LAYER 216K | 12 | | |

FIG. 7

| COMPONENT OF STACKED STRUCTURE | FILM THICKNESS OF INTERMEDIATE LAYER (μm) | DISTANCE FROM LIGHT INCIDENT SURFACE (μm) | RECORDING AND READING LAYER GROUP |
|---|---|---|---|
| L11 RECORDING AND READING LAYER 214L | | 162 | |
| TWELFTH INTERMEDIATE LAYER 216L | 16 | | |
| L12 RECORDING AND READING LAYER 214M | | 146 | |
| THIRTEENTH INTERMEDIATE LAYER 216M | 12 | | |
| L13 RECORDING AND READING LAYER 214N | | 134 | |
| FOURTEENTH INTERMEDIATE LAYER 216N | 16 | | |
| L14 RECORDING AND READING LAYER 214O | | 118 | |
| FIFTEENTH INTERMEDIATE LAYER 216O | 12 | | SECOND RECORDING AND READING LAYER GROUP 213B |
| L15 RECORDING AND READING LAYER 214P | | 106 | |
| SIXTEENTH INTERMEDIATE LAYER 216P | 16 | | |
| L16 RECORDING AND READING LAYER 214Q | | 90 | |
| SEVENTEENTH INTERMEDIATE LAYER 216Q | 12 | | |
| L17 RECORDING AND READING LAYER 214R | | 78 | |
| EIGHTEENTH INTERMEDIATE LAYER 216R | 16 | | |
| L18 RECORDING AND READING LAYER 214S | | 62 | |
| NINETEENTH INTERMEDIATE LAYER 216S | 12 | | |
| L19 RECORDING AND READING LAYER 214T | | 50 | |
| COVER LAYER | 50 | | |

FIG. 7 (continued)

| RECORDING LAYER | SINGLE-LAYER REFLECTANCE | STACKED-LAYER REFLECTANCE | SINGLE-LAYER ABSORPTANCE | STACKED-LAYER ABSORPTANCE |
|---|---|---|---|---|
| L0 | 1.70% | 0.19% | 6.88% | 2.28% |
| L1 | 1.70% | 0.22% | 6.88% | 2.50% |
| L2 | 1.70% | 0.27% | 6.88% | 2.74% |
| L3 | 1.70% | 0.32% | 6.88% | 3.00% |
| L4 | 1.70% | 0.39% | 6.88% | 3.29% |
| L5 | 1.70% | 0.47% | 6.88% | 3.60% |
| L6 | 0.70% | 0.21% | 3.74% | 2.05% |
| L7 | 0.70% | 0.23% | 3.74% | 2.15% |
| L8 | 0.70% | 0.25% | 3.74% | 2.25% |
| L9 | 0.70% | 0.28% | 3.74% | 2.36% |
| L10 | 0.70% | 0.30% | 3.74% | 2.47% |
| L11 | 0.70% | 0.33% | 3.74% | 2.58% |
| L12 | 0.70% | 0.37% | 3.74% | 2.71% |
| L13 | 0.70% | 0.40% | 3.74% | 2.83% |
| L14 | 0.70% | 0.44% | 3.74% | 2.97% |
| L15 | 0.70% | 0.48% | 3.74% | 3.11% |
| L16 | 0.70% | 0.53% | 3.74% | 3.26% |
| L17 | 0.70% | 0.58% | 3.74% | 3.41% |
| L18 | 0.70% | 0.64% | 3.74% | 3.57% |
| L19 | 0.70% | 0.70% | 3.74% | 3.74% |

FIG. 8C

| COMPONENT OF STACKED STRUCTURE | FILM THICKNESS OF INTERMEDIATE LAYER (μm) | DISTANCE FROM LIGHT INCIDENT SURFACE (μm) | RECORDING AND READING LAYER GROUP |
|---|---|---|---|
| L0 RECORDING AND READING LAYER 314A | | 314 | FIRST RECORDING AND READING LAYER GROUP 313A |
| FIRST INTERMEDIATE LAYER 316A | 12 | | |
| L1 RECORDING AND READING LAYER 314B | | 302 | |
| SECOND INTERMEDIATE LAYER 316B | 16 | | |
| L2 RECORDING AND READING LAYER 314C | | 286 | |
| THIRD INTERMEDIATE LAYER 316C | 12 | | |
| L3 RECORDING AND READING LAYER 314D | | 274 | |
| FOURTH INTERMEDIATE LAYER 316D | 16 | | |
| L4 RECORDING AND READING LAYER 314E | | 258 | |
| FIFTH INTERMEDIATE LAYER 316E | 12 | | |
| L5 RECORDING AND READING LAYER 314F | | 246 | SECOND RECORDING AND READING LAYER GROUP 313B |
| SIXTH INTERMEDIATE LAYER 316F | 16 | | |
| L6 RECORDING AND READING LAYER 314G | | 230 | |
| SEVENTH INTERMEDIATE LAYER 316G | 12 | | |
| L7 RECORDING AND READING LAYER 314H | | 218 | |
| EIGHTH INTERMEDIATE LAYER 316H | 16 | | |
| L8 RECORDING AND READING LAYER 314I | | 202 | |
| NINTH INTERMEDIATE LAYER 316I | 12 | | |
| L9 RECORDING AND READING LAYER 314J | | 190 | THIRD RECORDING AND READING LAYER GROUP 313B |
| TENTH INTERMEDIATE LAYER 316J | 16 | | |
| L10 RECORDING AND READING LAYER 314K | | 174 | |
| ELEVENTH INTERMEDIATE LAYER 316K | 12 | | |

FIG. 9

| COMPONENT OF STACKED STRUCTURE | FILM THICKNESS OF INTERMEDIATE LAYER (μm) | DISTANCE FROM LIGHT INCIDENT SURFACE (μm) | RECORDING AND READING LAYER GROUP |
|---|---|---|---|
| L11 RECORDING AND READING LAYER 314L | | 162 | |
| TWELFTH INTERMEDIATE LAYER 316L | 16 | | |
| L12 RECORDING AND READING LAYER 314M | | 146 | |
| THIRTEENTH INTERMEDIATE LAYER 316M | 12 | | |
| L13 RECORDING AND READING LAYER 314N | | 134 | |
| FOURTEENTH INTERMEDIATE LAYER 316N | 16 | | |
| L14 RECORDING AND READING LAYER 314O | | 118 | |
| FIFTEENTH INTERMEDIATE LAYER 316O | 12 | | |
| L15 RECORDING AND READING LAYER 314P | | 106 | THIRD RECORDING AND READING LAYER GROUP 313B |
| SIXTEENTH INTERMEDIATE LAYER 316P | 16 | | |
| L16 RECORDING AND READING LAYER 314Q | | 90 | |
| SEVENTEENTH INTERMEDIATE LAYER 316Q | 12 | | |
| L17 RECORDING AND READING LAYER 314R | | 78 | |
| EIGHTEENTH INTERMEDIATE LAYER 316R | 16 | | |
| L18 RECORDING AND READING LAYER 314S | | 62 | |
| NINETEENTH INTERMEDIATE LAYER 316S | 12 | | |
| L19 RECORDING AND READING LAYER 314T | | 50 | |
| COVER LAYER | 50 | | |

FIG. 9 (continued)

| RECORDING LAYER | SINGLE-LAYER REFLECTANCE | STACKED-LAYER REFLECTANCE | SINGLE-LAYER ABSORPTANCE | STACKED-LAYER ABSORPTANCE |
|---|---|---|---|---|
| L0 | 1.60% | 0.23% | 6.88% | 2.62% |
| L1 | 1.60% | 0.28% | 6.88% | 2.87% |
| L2 | 1.60% | 0.33% | 6.88% | 3.14% |
| L3 | 1.60% | 0.40% | 6.88% | 3.44% |
| L4 | 0.90% | 0.25% | 4.36% | 2.30% |
| L5 | 0.90% | 0.28% | 4.36% | 2.43% |
| L6 | 0.90% | 0.31% | 4.36% | 2.57% |
| L7 | 0.90% | 0.35% | 4.36% | 2.71% |
| L8 | 0.90% | 0.39% | 4.36% | 2.87% |
| L9 | 0.90% | 0.44% | 4.36% | 3.03% |
| L10 | 0.50% | 0.26% | 3.01% | 2.17% |
| L11 | 0.50% | 0.28% | 3.01% | 2.25% |
| L12 | 0.50% | 0.30% | 3.01% | 2.33% |
| L13 | 0.50% | 0.32% | 3.01% | 2.42% |
| L14 | 0.50% | 0.35% | 3.01% | 2.51% |
| L15 | 0.50% | 0.37% | 3.01% | 2.60% |
| L16 | 0.50% | 0.40% | 3.01% | 2.70% |
| L17 | 0.50% | 0.43% | 3.01% | 2.80% |
| L18 | 0.50% | 0.47% | 3.01% | 2.90% |
| L19 | 0.50% | 0.50% | 3.01% | 3.01% |

FIG. 10C

| COMPONENT OF STACKED STRUCTURE | FILM THICKNESS OF INTERMEDIATE LAYER (μm) | DISTANCE FROM LIGHT INCIDENT SURFACE (μm) | RECORDING AND READING LAYER GROUP |
|---|---|---|---|
| L0 RECORDING AND READING LAYER 414A | | 234 | FIRST RECORDING AND READING LAYER GROUP 413A |
| FIRST INTERMEDIATE LAYER 416A | 12 | | |
| L1 RECORDING AND READING LAYER 414B | | 222 | |
| SECOND INTERMEDIATE LAYER 416B | 12 | | |
| L2 RECORDING AND READING LAYER 414C | | 210 | |
| THIRD INTERMEDIATE LAYER 416C | 12 | | |
| L3 RECORDING AND READING LAYER 414D | | 198 | |
| FOURTH INTERMEDIATE LAYER 416D | 12 | | |
| L4 RECORDING AND READING LAYER 414E | | 186 | |
| FIFTH INTERMEDIATE LAYER 416E | 16 | | |
| L5 RECORDING AND READING LAYER 414F | | 170 | SECOND RECORDING AND READING LAYER GROUP 413B |
| SIXTH INTERMEDIATE LAYER 416F | 12 | | |
| L6 RECORDING AND READING LAYER 414G | | 158 | |
| SEVENTH INTERMEDIATE LAYER 416G | 12 | | |
| L7 RECORDING AND READING LAYER 414H | | 146 | |
| EIGHTH INTERMEDIATE LAYER 416H | 12 | | |
| L8 RECORDING AND READING LAYER 414I | | 134 | |
| NINTH INTERMEDIATE LAYER 416I | 12 | | |

FIG. 11

| COMPONENT OF STACKED STRUCTURE | FILM THICKNESS OF INTERMEDIATE LAYER (μm) | DISTANCE FROM LIGHT INCIDENT SURFACE (μm) | RECORDING AND READING LAYER GROUP |
|---|---|---|---|
| L9 RECORDING AND READING LAYER 414J | | 122 | |
| TENTH INTERMEDIATE LAYER 416J | 12 | | |
| L10 RECORDING AND READING LAYER 414K | | 110 | |
| ELEVENTH INTERMEDIATE LAYER 416K | 12 | | |
| L11 RECORDING AND READING LAYER 414L | | 98 | |
| TWELFTH INTERMEDIATE LAYER 416L | 12 | | SECOND RECORDING AND READING LAYER GROUP 413B |
| L12 RECORDING AND READING LAYER 414M | | 86 | |
| THIRTEENTH INTERMEDIATE LAYER 416M | 12 | | |
| L13 RECORDING AND READING LAYER 414N | | 74 | |
| FOURTEENTH INTERMEDIATE LAYER 416N | 12 | | |
| L14 RECORDING AND READING LAYER 414O | | 62 | |
| FIFTEENTH INTERMEDIATE LAYER 416O | 12 | | |
| L15 RECORDING AND READING LAYER 414P | | 50 | |
| COVER LAYER | 50 | | |

FIG. 11 (continued)

| RECORDING LAYER | SINGLE-LAYER REFLECTANCE | STACKED-LAYER REFLECTANCE | SINGLE-LAYER ABSORPTANCE | STACKED-LAYER ABSORPTANCE |
|---|---|---|---|---|
| L0 | 1.40% | 0.44% | 6.50% | 3.66% |
| L1 | 1.40% | 0.52% | 6.50% | 3.98% |
| L2 | 1.40% | 0.62% | 6.50% | 4.32% |
| L3 | 1.40% | 0.73% | 6.50% | 4.70% |
| L4 | 0.70% | 0.41% | 4.48% | 3.42% |
| L5 | 0.70% | 0.45% | 4.48% | 3.61% |
| L6 | 0.70% | 0.51% | 4.48% | 3.81% |
| L7 | 0.70% | 0.56% | 4.48% | 4.02% |
| L8 | 0.70% | 0.63% | 4.48% | 4.24% |
| L9 | 0.70% | 0.70% | 4.48% | 4.48% |

FIG. 12C

| A | L0 | L1 | L2 | L3 | L4 | L5 | L6 | L7 | L8 | L9 |
|---|---|---|---|---|---|---|---|---|---|---|
| Jitter [%] Pr=3mW 1tr | 7.9 | 5.7 | 5.9 | 5.5 | 5.4 | 7.1 | 6.7 | 6.4 | 6.9 | 6.6 |
| Jitter [%] Pr=3mW 5tr | 8.5 | 6.8 | 6.9 | 6.5 | 5.9 | 7.6 | 7.2 | 7.4 | 7.6 | 7.4 |
| Recording power [mW] | 22.00 | 25.00 | 25.50 | 24.00 | 24.50 | 25.00 | 24.50 | 23.50 | 23.00 | 22.00 |

FIG. 13A

| B | L0 | L1 | L2 | L3 | L4 | L5 | L6 | L7 | L8 | L9 |
|---|---|---|---|---|---|---|---|---|---|---|
| Jitter [%] Pr=3mW 1tr | 6.8 | 5.8 | 5.6 | 5.3 | 6.6 | 6.4 | 6.2 | 5.9 | 5.7 | 5.6 |
| Jitter [%] Pr=3mW 5tr | 7.6 | 6.8 | 6.2 | 5.8 | 7.9 | 7.5 | 7.4 | 7.2 | 6.7 | 6.6 |
| Recording power [mW] | 30.00 | 26.50 | 24.75 | 22.50 | 30.00 | 28.00 | 26.75 | 25.50 | 23.75 | 22.00 |

FIG. 13B

| 25GB Jitter / % | Normal | 2Block |
|---|---|---|
| L0 | 8.50 | 7.60 |
| L1 | 6.80 | 6.80 |
| L2 | 6.90 | 6.20 |
| L3 | 6.50 | 5.80 |
| L4 | 5.90 | 7.90 |
| L5 | 7.60 | 7.50 |
| L6 | 7.20 | 7.40 |
| L7 | 7.40 | 7.20 |
| L8 | 7.60 | 6.70 |
| L9 | 7.40 | 6.60 |

FIG. 13C

| Rec Power / mW | Normal | 2Block |
|---|---|---|
| L0 | 22.00 | 30.00 |
| L1 | 25.00 | 26.50 |
| L2 | 25.50 | 24.75 |
| L3 | 24.00 | 22.50 |
| L4 | 24.50 | 30.00 |
| L5 | 25.00 | 28.00 |
| L6 | 24.50 | 26.75 |
| L7 | 23.50 | 25.50 |
| L8 | 23.00 | 23.75 |
| L9 | 22.00 | 22.00 |

FIG. 13D

| Reflectance / % | Normal | 2Block |
|---|---|---|
| L0 | 1.27 | 0.86 |
| L1 | 1.46 | 0.95 |
| L2 | 1.20 | 1.05 |
| L3 | 1.23 | 1.16 |
| L4 | 1.27 | 0.74 |
| L5 | 1.21 | 0.76 |
| L6 | 1.09 | 0.82 |
| L7 | 1.28 | 0.92 |
| L8 | 1.23 | 1.06 |
| L9 | 1.02 | 1.08 |

FIG. 13E

| RECORDING LAYER | SINGLE-LAYER REFLECTANCE | STACKED-LAYER REFLECTANCE | SINGLE-LAYER ABSORPTANCE | STACKED-LAYER ABSORPTANCE |
|---|---|---|---|---|
| L0 | 1.5% | 0.5% | 4.5% | 2.5% |
| L1 | 1.5% | 0.5% | 4.5% | 2.7% |
| L2 | 1.5% | 0.6% | 4.5% | 2.9% |
| L3 | 1.5% | 0.7% | 4.5% | 3.1% |
| L4 | 1.5% | 0.8% | 4.5% | 3.3% |
| L5 | 1.5% | 0.9% | 4.5% | 3.5% |
| L6 | 1.5% | 1.0% | 4.5% | 3.7% |
| L7 | 1.5% | 1.2% | 4.5% | 3.9% |
| L8 | 1.5% | 1.3% | 4.5% | 4.2% |
| L9 | 1.5% | 1.5% | 4.5% | 4.5% |

FIG. 19C

| RECORDING LAYER | SINGLE-LAYER REFLECTANCE | STACKED-LAYER REFLECTANCE | SINGLE-LAYER ABSORPTANCE | STACKED-LAYER ABSORPTANCE |
|---|---|---|---|---|
| L0 | 8.5% | 1.4% | 13.5% | 5.4% |
| L1 | 6.2% | 1.5% | 10.6% | 5.2% |
| L2 | 4.1% | 1.3% | 8.8% | 4.9% |
| L3 | 3.2% | 1.3% | 7.5% | 4.8% |
| L4 | 2.5% | 1.2% | 6.7% | 4.7% |
| L5 | 2.1% | 1.2% | 6.0% | 4.6% |
| L6 | 1.7% | 1.2% | 5.5% | 4.5% |
| L7 | 1.4% | 1.1% | 5.0% | 4.5% |
| L8 | 1.2% | 1.1% | 4.7% | 4.4% |
| L9 | 1.1% | 1.1% | 4.4% | 4.4% |

FIG. 20C

MULTILAYER OPTICAL RECORDING MEDIUM

BACKGROUND OF THE INVENTION

1. Field of the Invention

The present invention relates to a multilayer optical recording medium with a plurality of stacked recording and reading layers from which information can be read by light irradiation, and in particular, to a technique for enhancing the quality of a reading signal.

2. Description of the Related Art

In the field of optical recording media, recording density has been increased by shortening the wavelengths of laser light sources or by increasing the numerical apertures of optical systems. However, efforts by light sources or optical systems have reached their limits. Accordingly, a volumetric recording system in which information is multiply recorded in the direction of an optical axis has been desired in order to increase recording capacity further. With reference, for example, to optical recording media in accordance with the standards for Blu-ray Disc (BD), those with two recording and reading layers have already been on the market, and those with three or four recording and reading layers wait for standardization at the time of filing of the present application. Further, multilayer optical recording media with 20 recording and reading layers dedicated to reading, and multilayer optical recording media with 10 to 16 recording and reading layers usable for recording and reading have been demonstrated in the stage of experiment and research.

Multilayer optical recording media may suffer from mixing a signal of other recording and reading layers into a target recording and reading layer, or leakage of noise generated by the effect of other recording and reading layers into a target recording and reading layer during the reading of information from the target recording and reading layer. Such mixing or leakage problems generally referred to as crosstalk result in degradation of a servo signal or a recording signal.

The crosstalk includes two types including interlayer crosstalk and confocal crosstalk. The interlayer crosstalk is a phenomenon produced by leakage of light reflected off a recording and reading layer next to a recording and reading layer being read into reading light. Accordingly, the interlayer crosstalk is always a matter of concern in multilayer optical recording media with two or more recording and reading layers. The interlayer crosstalk is reduced by increasing an interlayer distance.

The confocal crosstalk is specific to multilayer optical recording media with three or more recording and reading layers. The confocal crosstalk is a phenomenon produced by coincidence in optical path length between primary reading light reflected off a recording and reading layer being read only once, and stray light reflected off a different recording and reading layer a plurality of times.

Principles of generation of the confocal crosstalk are described with reference to FIGS. 15 to 18. In a multilayer optical recording medium 40 shown in FIG. 15, a beam 70 focused on an L0 recording and reading layer 40d for reading or recording is split into a plurality of optical beams due to semi-light-transmitting properties of recording and reading layers. FIG. 16 shows a phenomenon where a beam 71 branching off from a beam targeted for recording and reading to and from an L0 recording and reading layer 40d is reflected off an L1 recording and reading layer 40c and is focused on an L2 recording and reading layer 40b, and the resulting reflected light is detected after being reflected off the L1 recording and reading layer 40c again.

FIG. 17 shows a phenomenon where a beam 72 branching off from a beam targeted for recording and reading to and from an L0 recording and reading layer 40d is reflected off an L2 recording and reading layer 40b and is focused on a light incident surface 40z, and the resulting reflected light is detected after being reflected off the L2 recording and reading layer 40b again. This stray light phenomenon is called rear focus light of a light incident surface. FIG. 18 shows a phenomenon where a beam 73 branching off a beam targeted for recording and reading to and from an L0 recording and reading layer 40d is not focused on a different recording and reading layer, but is detected after being reflected off L1, L3 and L2 recording and reading layers 40c, 40a and 40b in this order.

The light amounts of the beams 71 to 73 as stray light are smaller than that of the beam 70. However, the beams 71 to 73 enter a photodetector with the same optical path length and with the same radius of light flux, generating influential interference. Accordingly, the amount of light received by the photodetector can vary largely in response to the minute change of an interlayer thickness, making it difficult to detect a stable signal. Meanwhile, the amount of stray light determined by the product of the respective reflectances of recording and reading layers decreases as the stray light is reflected a greater number of times. Accordingly, for practical purposes, considering stray light reflected off multiple surfaces three times is sufficient.

In the phenomena shown in FIGS. 15 to 18, the beams 70 and 71 have the same optical path length and the same radius of light flux if T1 is set to be equal to T2. In this case, the beams 70 and 71 enter the photodetector and are detected at the same time. Likewise, the beams 70 and 72 have the same optical path length and the same radius of light flux if the total of T1 and T2 is set to be equal to the total of T3 and TC. Also, the beams 70 and 73 have the same optical path length and the same radius of light flux if T3 is set to be equal to T1. Accordingly, making all interlayer distances different is a generally employed technique to avoid the confocal crosstalk.

Non-Patent Literature 1: Ichimura et. al., Appl. Opt, 45, 1974-1803 (2006), and Non-Patent Literature 2: K. Mishima et al., Proc. of SPIE, 6282, 628201 (2006) are introduced as the Prior Art Document.

In some cases, concavities and convexities for tracking control such as grooves and lands should be formed in each recording and reading layer. In these cases, concavities and convexities should be formed in each intermediate layer with a stamper, so that an error is likely to be generated in the film thicknesses of the intermediate layers. The intermediate layers may be set to have different film thicknesses in consideration of the effect of such an error generated during film deposition in advance. This however requires setting of a rather large difference between film thicknesses, resulting in more and more greater thickness of a multilayer optical recording medium.

SUMMARY OF THE INVENTION

The present invention has been made in view of the aforementioned problems. It is an object of the invention to provide a multilayer optical recording medium that can prevent the degradation of a signal quality due to crosstalk and simplify the design of the multilayer optical recording medium when the medium includes multiple recording and reading layers, and further simplify recording and reading control by a recording and reading unit.

The present inventors have conducted intensive study and found that the aforementioned object is realized by the following means.

The invention to achieve the aforementioned object is intended for a multilayer optical recording medium with at least six or more recording and reading layers disposed one above the other with intermediate layers interposed therebetween, wherein information can be read by light irradiation. The multilayer optical recording medium has at least two or more recording and reading layer groups each including the plurality of recording and reading layers successively disposed one above the other in the order in which the layers are stacked so that the reflectance of each of the recording and reading layers in a stacked state in each of the groups decreases in the order from a front side near a light incident surface toward a back side far from the light incident surface. Regarding the recording and reading layer groups adjacent to each other with any of the intermediate layers interposed therebetween, a recording and reading layer nearest the front side among the recording and reading layers in the recording and reading layer group nearer the back side has a reflectance in a stacked state higher than that of a recording and reading layer nearest the back side among the recording and reading layers in the recording and reading layer group nearer the front side.

In the multilayer optical recording medium to achieve the aforementioned object in accordance with the present invention, the intermediate layer disposed between the adjacent recording and reading layer groups has a film thickness greater than those of two intermediate layers that are adjacent to recording and reading layers disposed on both sides of the intermediate layer between the two groups.

In the multilayer optical recording medium to achieve the aforementioned object in accordance with the present invention, a plurality of film thicknesses are set for the intermediate layers, and the intermediate layer disposed between the adjacent recording and reading layer groups has the maximum film thickness of the plurality of film thicknesses.

In the multilayer optical recording medium to achieve the aforementioned object in accordance with the present invention, the intermediate layers disposed in the recording and reading layer groups have substantially the same film thickness in each of the recording and reading layer groups.

In the multilayer optical recording medium to achieve the aforementioned object in accordance with the present invention, the intermediate layers include a first intermediate layer having a first film thickness and a second intermediate layer having a second film thickness greater than the first film thickness, the first and second intermediate layers being alternately disposed one above the other with the recording and reading layer interposed therebetween.

In the multilayer optical recording medium to achieve the aforementioned object in accordance with the present invention, the second intermediate layer is disposed between the adjacent recording and reading layer groups.

The multilayer optical recording medium to achieve the aforementioned object in accordance with the present invention has three or more of the recording and reading layer groups, and the recording and reading layer group(s) except the recording and reading layer groups nearest the front side and nearest the back side has(have) an even number of the recording and reading layers.

The multilayer optical recording medium to achieve the aforementioned object in accordance with the present invention has two of the recording and reading layer groups.

In the multilayer optical recording medium to achieve the aforementioned object in accordance with the present invention, at least one of the recording and reading layer groups includes four or more of the recording and reading layers.

In the multilayer optical recording medium to achieve the aforementioned object in accordance with the present invention, the number of the recording and reading layers forming the farthest one of the recording and reading layer groups from the light incident surface is four or smaller.

The multilayer optical recording medium to achieve the aforementioned object in accordance with the present invention has at least eight or more of the recording and reading layers.

The present invention achieves simple design of the multilayer optical recording medium while suppressing interlayer crosstalk and confocal crosstalk in the multilayer optical recording medium. The invention also achieves simple recording and reading control by a recording and reading unit.

BRIEF DESCRIPTION OF THE DRAWINGS

FIGS. 3A-3C are respective graphs and a table showing the reflectances and absorptances of the multilayer optical recording medium;

FIG. 4 is a diagram showing the formation of film thicknesses of the multilayer optical recording medium;

FIG. 5 is a diagram showing the formation of film thicknesses of a multilayer optical recording medium according to a second embodiment;

FIGS. 6A-6C are respective graphs and a table showing the reflectances and absorptances of the multilayer optical recording medium according to the second embodiment;

FIG. 7 is a diagram showing the formation of film thicknesses of a multilayer optical recording medium according to a third embodiment;

FIGS. 8A-8C are respective graphs and a table showing the reflectances and absorptances of the multilayer optical recording medium according to the third embodiment;

FIG. 9 is a diagram showing the formation of film thicknesses of a multilayer optical recording medium according to a fourth embodiment;

FIGS. 10A-10C are respective graphs and a table showing the reflectances and absorptances of the multilayer optical recording medium according to the fourth embodiment;

FIG. 11 is a diagram showing the formation of film thicknesses of a multilayer optical recording medium according to a fifth embodiment;

FIGS. 12A-12C are respective graphs and a table showing the reflectances and absorptances of a multilayer optical recording medium of Example B of the invention;

FIGS. 13A-13H respectively are tables and graphs showing recording conditions and the qualities of reading signals relating to multilayer optical recording media of Comparative Example A and Example B of the invention;

FIGS. 19A-19C are respective graphs and a table showing the reflectances and absorptances of a multilayer optical recording medium of a reference example; and FIGS. 20A-20C are respective graphs and a table showing the reflectances and absorptances of a multilayer optical recording medium of a reference example.

DETAILED DESCRIPTION OF THE PREFERRED EMBODIMENTS

Embodiments of the present invention will be described below with reference to the accompanying drawings.

Figure 1:
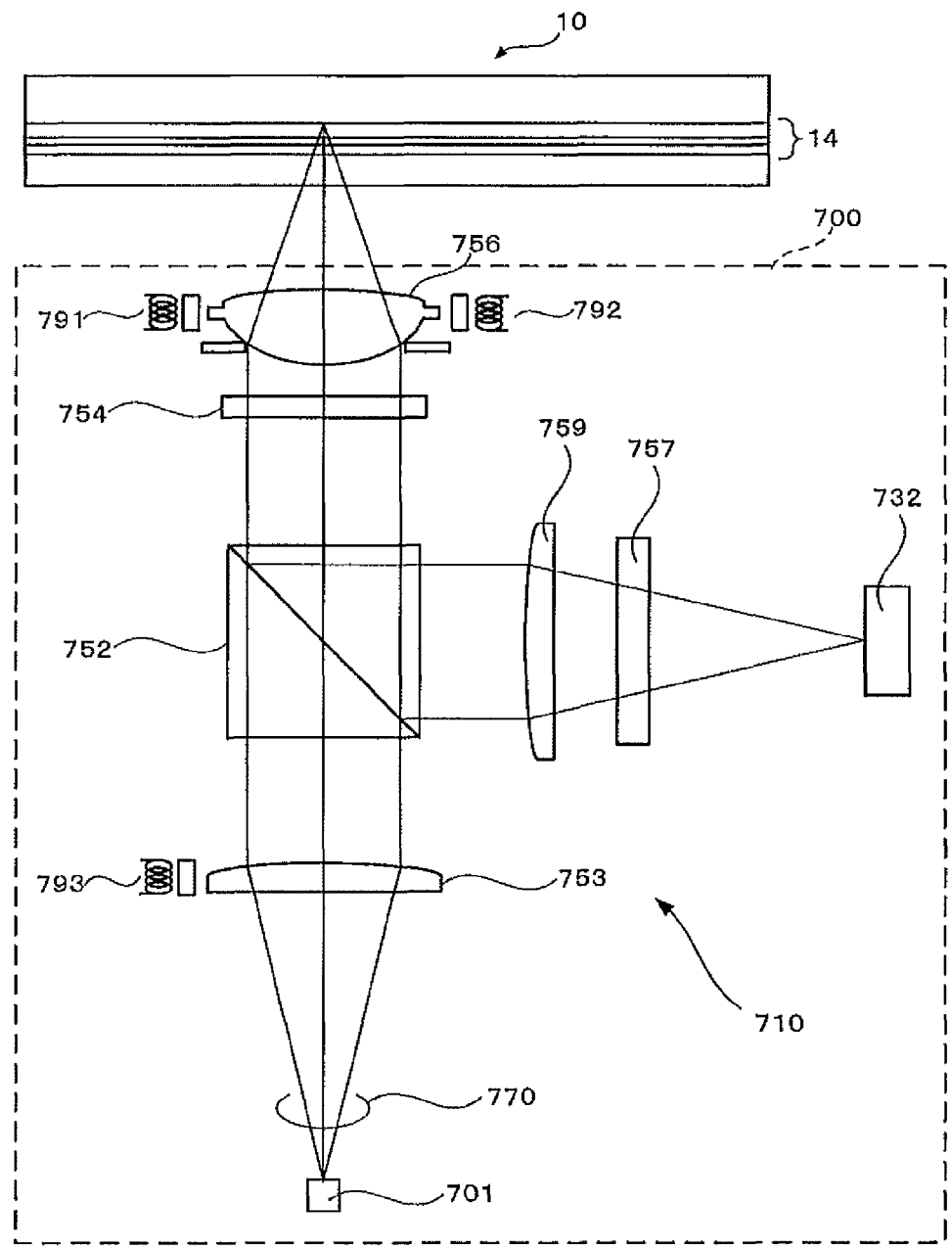
FIG. 1 is a schematic diagram showing the structure of a multilayer optical recording medium according to a first embodiment of the present invention, and that of an optical pickup for recording and reading to and from the multilayer optical recording medium.

FIG. 1 shows the structure of a multilayer optical recording medium 10 according to a first embodiment, and the structure of an optical pickup 700 used for recording and reading to and from the multilayer optical recording medium 10.

The optical pickup 700 includes an optical system 710. The optical system 710 performs recording and reading to and from a recording and reading layer group 14 of the multilayer optical recording medium 10. A diverging beam 770 having a relatively short wavelength of a blue color of from 380 to 450 nm (here, 405 nm) emitted from a light source 701 passes through a collimating lens 753 with spherical aberration correcting means 793, and thereafter enters a polarizing beam splitter 752. The beam 770 having entered the polarizing beam splitter 752 passes through the polarizing beam splitter 752, and thereafter passes through a quarter-wave plate 754 to be converted to circularly polarized light. Next, the beam 770 is converted to a convergent beam by an objective lens 756. The beam 770 is focused on any one of a plurality of recording and reading layers forming the group 14 in the multilayer optical recording medium 10.

The beam 770 reflected off the polarizing beam splitter 752 passes through a condensing lens 759 to be converted to convergent light, and thereafter enters a photodetector 732 through a cylindrical lens 757. The beam 770 is given astigmatism when passing through the cylindrical lens 757. The photodetector 732 includes four light receiving sections not shown each of which output a current signal corresponding to the amount of received light. These current signals are used to generate a focus error (hereinafter called FE) signal based on the astigmatism method, a tracking error (hereinafter called TE) signal based on the push-pull method employed only during reading, a reading signal for reading information recorded in the multilayer optical recording medium 10, and others. The FE and TE signals are subjected to amplification and phase compensation at desirable levels, and are thereafter fed back to actuators 791 and 792 to be used for focus control and tracking control.

Figure 2:
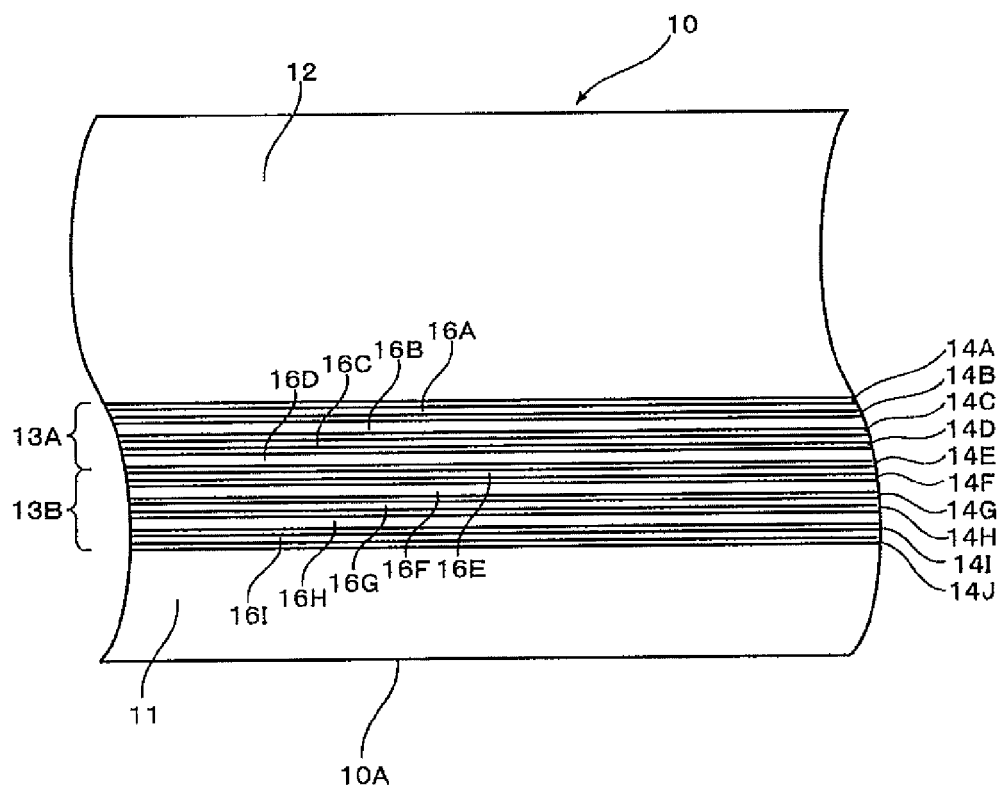
FIG. 2 is a sectional view of the stacked structure of the multilayer optical recording medium.

FIG. 2 shows the structure in cross section of the multilayer optical recording medium 10 in an enlarged manner.

The multilayer optical recording medium 10 is in the form of a disk having an outer diameter of about 120 mm and a thickness of about 1.2 mm, and is configured to include six or more recording and reading layers. The multilayer optical recording medium 10 includes: a cover layer 11; a second recording and reading layer group 13B, a first recording and reading layer group 13A, and an intermediate layer group 16; and a support substrate 12 in the order as viewed from a light incident surface 10A.

The support substrate 12 is given grooves with a track pitch of 0.32 μm. Various materials such as glass, ceramics and resin are applicable to form the support substrate 12. Of the materials cited, resin is preferred in terms of easiness of molding. Examples of the resin include polycarbonate resins, olefin resins, acrylic resins, epoxy resins, polystyrene resins, polyethylene resins, polypropylene resins, silicone resins, fluorine-based resins, ABS resins, and urethane resins. Of the resins cited, polycarbonate resins and olefin resins are preferred in terms, for example, of easiness of processing. The support substrate 12 is not required to have high light-transmitting properties as it does not form an optical path of the beam 770.

The first and second recording and reading layer groups 13A and 13B each include a plurality of recording and reading layers successively disposed one above the other in the order in which the layers are stacked. Regarding the recording and reading layers belonging to each of the first and second recording and reading layer groups 13A and 13B, the reflectance of each of the recording and reading layers in a stacked state (hereinafter called stacked-layer reflectance) decreases in the order from a front side near the light incident surface toward a back side far from the light incident surface.

More specifically, the first recording and reading layer group 13A has a four-layered structure with L0 to L3 recording and reading layers 14A to 14D. The second recording and reading layer group 13B has a six-layered structure with L4 to L9 recording and reading layers 14E to 14J. Accordingly, in the first recording and reading layer group 13A, the L3 recording and reading layer 14D nearest the light incident surface has the highest stacked-layer reflectance, and the L0 recording and reading layer 14A has the lowest stacked-layer reflectance. Likewise, in the second recording and reading layer group 13B, the L9 recording and reading layer 14J nearest the light incident surface has the highest stacked-layer reflectance, and the L4 recording and reading layer 14E has the lowest stacked-layer reflectance.

The first and second recording and reading layer groups 13A and 13B are adjacent to each other while an intermediate layer is interposed therebetween. Regarding the adjacent first and second recording and reading layer groups 13A and 13B, the L3 recording and reading layer 14D nearest the front side with respect to the light incident surface in the first recording and reading layer group 13A nearer the back side has a stacked-layer reflectance higher than that of the L4 recording and reading layer 14E nearest the back side in the second recording and reading layer group 13B nearer the front side. To be specific, a stacked-layer reflectance decreases in the order, in which these layers are stacked, from the L9 recording and reading layer 14J to the L4 recording and reading layer 14E with respect to the light incident surface. However, the stacked-layer reflectance increases once at the L3 recording and reading layer 14D, and again starts to decrease thereafter in the order, in which the layers are stacked, toward the L0 recording and reading layer 14A.

Film design to achieve the aforementioned stacked-layer reflectance is such that the optical reflectance, absorptance and others of each of the L0 to L9 recording and reading layers 14A to 14J as a single layer are optimized in response to the beam 770 in a wavelength range of a blue color in the optical system 710.

Figure 3A:
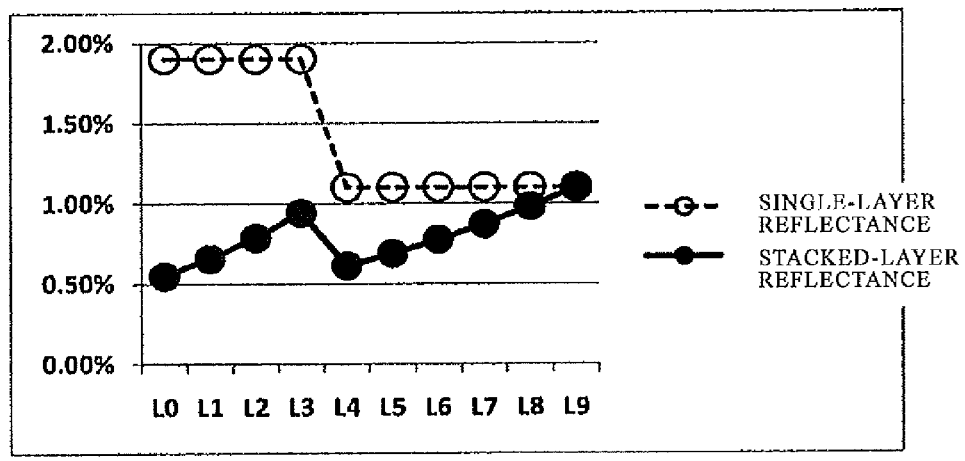
Figure 3B:
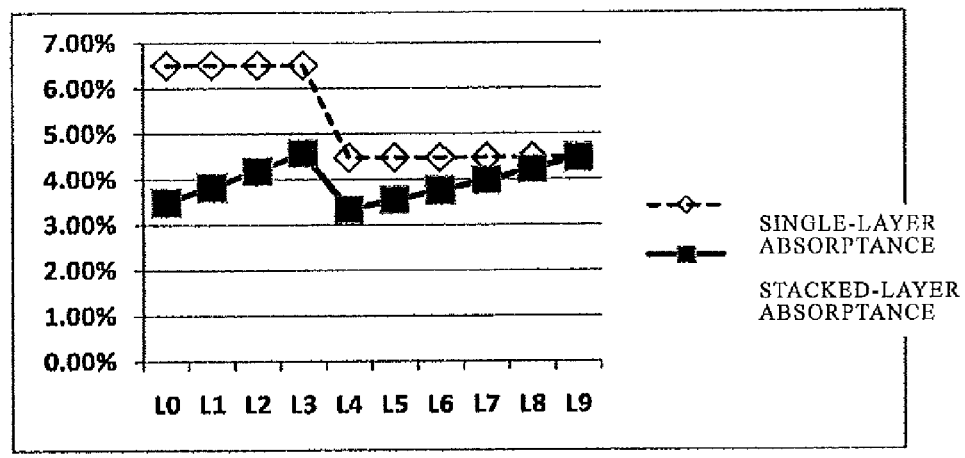

More specifically, as shown in FIGS. 3A-3C, the L0 to L3 recording and reading layers 14A to 14D belonging to the first recording and reading layer group 13A farther from the light incident surface each have a first single-layer reflectance that is the reflectance of each of the L0 to L3 recording and reading layers 14A to 14D as a single layer (hereinafter called single-layer reflectance), and a first single-layer absorptance that is the absorptance of each of the L0 to L3 recording and reading layers 14A to 14D as a single layer (hereinafter called single-layer absorptance). To be specific, the first single-layer reflectance is set to 1.9%, and the first single-layer absorptance is set to 6.5%.

The L4 to L9 recording and reading layers 14E to 14J belonging to the second recording and reading layer group 13B nearer the light incident surface each have a second single-layer reflectance and a second single-layer absorptance smaller than the first single-layer reflectance and the first single-layer absorptance. To be specific, the second single-layer reflectance is set to 1.1%, and the second single-layer absorptance is set to 4.5%. As described above, in the present embodiment, the L0 to L3 recording and reading layers 14A to 14D in the first recording and reading layer group 13A have substantially the same single-layer reflectance and the single-layer absorptance. Further, the L4 to L9 recording and reading layers 14E to 14J in the second recording and reading layer group 13B have substantially the same single-layer reflectance and the single-layer absorptance. Thus, the stacked-layer reflectance decreases sequentially in the order with respect to the light incident surface in each of the first and second recording and reading layer groups 13A and 13B. Further, since the single-layer reflectance in the first recording and reading layer group 13A is higher than that in the second recording and reading layer group 13B, this makes the stacked-layer reflectance of the L3 recording and reading layer 14D higher than that of the L4 recording and reading layer 14E.

Employing the film design described above makes it possible to form the L0 to L3 recording and reading layers 14A to 14D into substantially the same film thickness by using substantially the same material. This film design also makes it possible to form the L4 to L9 recording and reading layers 14E to 14J into substantially the same film thickness by using substantially the same material. This realizes significant reduction of manufacturing cost.

The L0 to L9 recording and reading layers 14A to 14J each have a structure with three to five layers including dielectric films and the like formed on opposite sides of a write-once recording film (not shown). The dielectric films and the like of each of the recording and reading layers have a basic function to protect the write-once recording film. These dielectric films also function to enlarge a difference between optical characteristics before formation of a recording mark and those after the formation, and to enhance recording sensitivity.

The present embodiment includes successive recording and reading layers, and shows the exemplary structure with two recording and reading layer groups in each of which a stacked-layer reflectance decreases sequentially in the order with respect to the light incident surface. Meanwhile, the present embodiment is required to have at least two or more recording and reading layer groups, and preferably, three or more groups.

If energy in large quantities is absorbed in the dielectric films, recording sensitivity is likely to be reduced when irradiated with the beam 770. This is avoided preferably by selecting a material having a low absorption coefficient (k) in a wavelength range of from 380 nm to 451 nm (in particular, 405 nm) to form these dielectric films. The present embodiment uses $TiO_2$ as a material of the dielectric films.

The write-once recording film interposed between the dielectric films is a film in which an irreversible recording mark is formed. Part of the write-once recording film with the recording mark and the other part of the write-once recording film (blank region) have significantly different reflectances to the beam 770, thereby realizing recording and reading of data.

The write-once recording film is formed by using a material containing Bi and O as a principal component. The write-once recording film functions as an inorganic reaction film, and the reflectance thereof largely varies in response to its chemical or physical change caused by the heat of laser light. The principal component of the write-once recording film is preferably Bi—O, or Bi-M-O (M is at least one element selected from Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga and Pb). In the present embodiment, Bi—Ge—O is used as a material of the write-once recording film.

The L0 to L9 recording and reading layers 14A to 14J are shown to have write-once recording films. Meanwhile, phase-change recording films for repeatable recording may also be used. In this case, that phase-change recording films are preferably made of SbTeGe.

As shown in FIG. 4, the intermediate layer group 16 includes first to ninth intermediate layers 16A to 16I provided in this order as viewed from the opposite side of the light incident surface 10A. The first to ninth intermediate layers 16A to 16I are disposed between the L0 to L9 recording and reading layers 14A to 14J. The intermediate layers 16A to 16I are each made of an acrylic or epoxy UV-curable resin. A first distance T1 of 10 μm or more, and a second distance T2 greater than the first distance T1 by 3 μm or more, are alternately set as the thicknesses of the intermediate layers 16A to 16I. More specifically, the first and second distances T1 and T2 preferably have a difference of from 3 μm to 5 μm therebetween, and more preferably, have a difference of 4 μm or more therebetween.

The multilayer optical recording medium 10 employs the first distance T1 of 12 μm, and the second distance T2 of 16 μm. The first to ninth intermediate layers 16A to 16I arranged in this order as viewed from the back side have film thicknesses of 12 μm, 16 μm, 12 μm, 16 μm, 12 μm, 16 μm, 12 μm, 16 μm, and 12 μm, respectively. That is, the intermediate layers of the two film thicknesses (16 μm and 12 μm) are alternately disposed one above the other, and this reduces both interlayer crosstalk and confocal crosstalk as described in more detail later.

In particular, the fourth intermediate layer 16D interposed between the first and second recording and reading layer groups 13A and 13B is set to have the second distance T2 (16 μm) corresponding to the greater film thickness. The fourth intermediate layer 16D has a film thickness greater than those of the third and fifth intermediate layers 16C and 16E that are adjacent to L3 and L4 recording and reading layers 14D and 14E disposed on both sides of the fourth intermediate layer 16D between the two groups. This means that the fourth intermediate layer 16D has a film thickness greater than that of the third intermediate layer 16C adjacent to the fourth intermediate layer 16D while the L3 recording and reading layer 14D is interposed therebetween, and greater than that of the fifth intermediate layer 16E adjacent to the fourth intermediate layer 16D while the L4 recording and reading layer 14E is interposed therebetween.

As already described above, regarding the adjacent L3 and L4 recording and reading layers 14D and 14E belonging to the first and second recording and reading layer groups 13A and 13B, respectively, the L3 recording and reading layer 14D nearer the back side has a higher stacked-layer reflectance (the order of stacked-layer reflectances is reversed). Accordingly, during reading from the L4 recording and reading layer 14E nearer the front side, light reflected off the L3 recording and reading layer 14D nearer the back side easily mixes into reading light. To cope with this, the fourth intermediate layer 16D interposed between the first and second recording and reading layer groups 13A and 13B has a greater film thickness to reduce the interlayer crosstalk.

Like the intermediate layer group 16, the cover layer 11 is made of a light-transmitting acrylic UV-curable resin, and has a film thickness of 50 µm.

A method of manufacturing the multilayer optical recording medium 10 will next be described. First, the support substrate 12 with grooves and lands formed thereon is formed by injection molding of a polycarbonate resin with a metal stamper. The process of forming the support substrate 12 is not limited to such an injection molding. The support substrate 12 may also be formed by other processes such as the 2P process.

Next, the L0 recording and reading layer 14A is formed on the surface of the support substrate 12 with the grooves and lands formed thereon.

More specifically, a dielectric film, a write-once recording film, and a dielectric film are formed in this order by vapor-phase growth method, which is preferably sputtering. Next, the first intermediate layer 16A is formed on the L0 recording and reading layer 14A. The first intermediate layer 16A is formed, for example, by depositing a UV-curable resin with a controlled viscosity by spin-coating and the like, and then by curing the deposited UV-curable resin by irradiation with an ultraviolet ray. These processes are repeated to form the L1 recording and reading layer 14B, the second intermediate layer 16B, the L2 recording and reading layer 14C, the third intermediate layer 16C, and the other layers that are sequentially disposed in this order one above the other.

After formation of the L9 recording and reading layer 14J, the cover layer 11 is formed on the L9 recording and reading layer 14J to complete the multilayer optical recording medium 10. The cover layer 11 is formed, for example, by depositing an acrylic or epoxy UV-curable resin with a controlled viscosity by spin-coating and the like, and then by curing the deposited UV-curable resin by irradiation with an ultraviolet ray. The manufacturing method of the invention is not limited to the aforementioned manufacturing method of the first embodiment, but other manufacturing techniques are also applicable.

The action of the multilayer optical recording medium 10 will next be described.

The multilayer optical recording medium 10 includes the first and second recording and reading layer groups 13A and 13B in each of which the stacked-layer reflectance of each recording and reading layer decreases in the order from the front side near the light incident surface toward the back side. Further, regarding the first and second recording and reading layer groups 13A and 13B, the L3 recording and reading layer 14D nearest the front side in the first recording and reading layer group 13A nearer the back side has a stacked-layer reflectance higher than that of the L4 recording and reading layer 14E nearest the back side in the second recording and reading layer group 13B.

As described above, the stacked-layer reflectance of each recording and reading layer decreases sequentially in the order toward the back side in each of the recording and reading layer groups 13A and 13B. Accordingly, during reading from a specific recording and reading layer, light reflected off an adjacent recording and reading layer nearer the back side than the specific recording and reading layer does not mix into reading light. This makes it possible to reduce the thicknesses of the intermediate layers, allowing the number of stacked recording and reading layers in the recording and reading layer groups 13A and 13B to be increased.

Figure 19A:
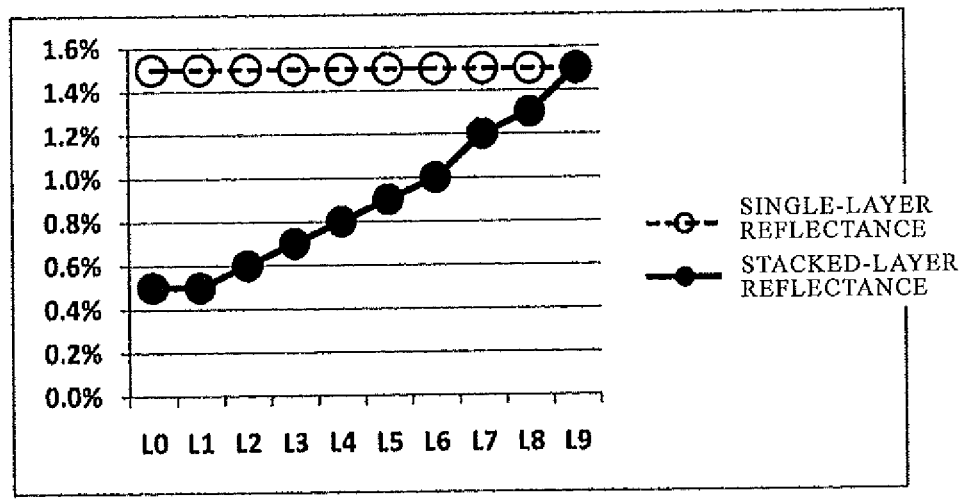
Figure 19B:
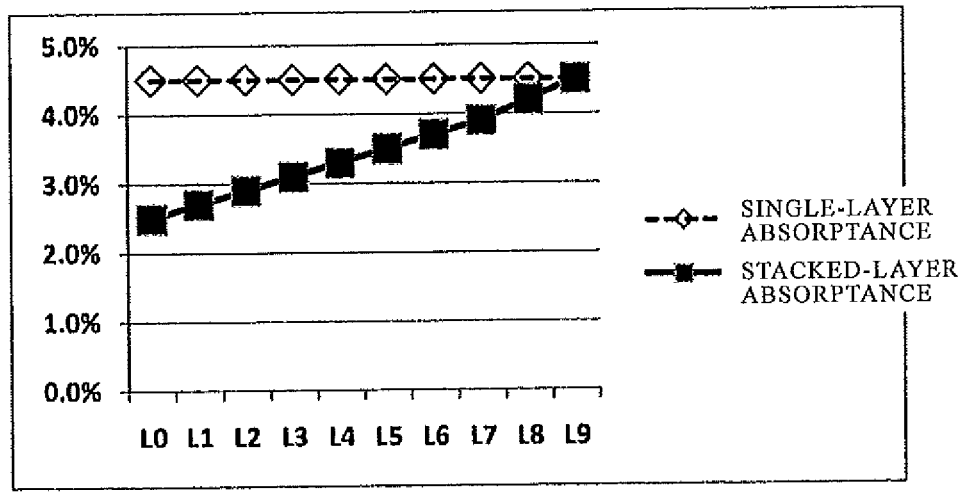

In a reference example shown in FIGS. 19A-19C, the stacked-layer reflectances of all the L0 to L9 recording and reading layers 14A to 14J may decrease sequentially in the order with respect to the light incident surface, for example. This makes a difference too large between the stacked-layer reflectance of the L9 recording and reading layer 14J nearest the light incident surface and that of the L0 recording and reading layer 14A farthest from the light incident surface. Accordingly, in this case, the number of stacked layers is hard to increase.

Figure 20A:
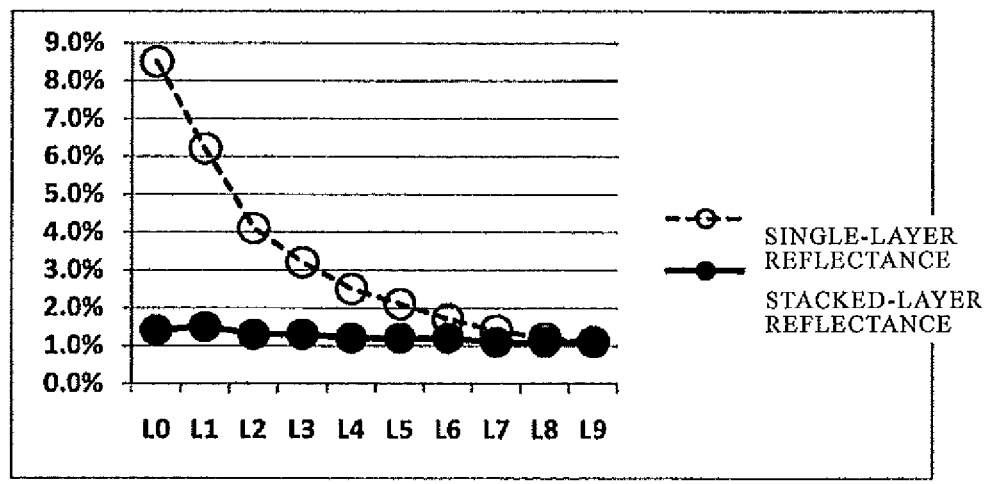
Figure 20B:
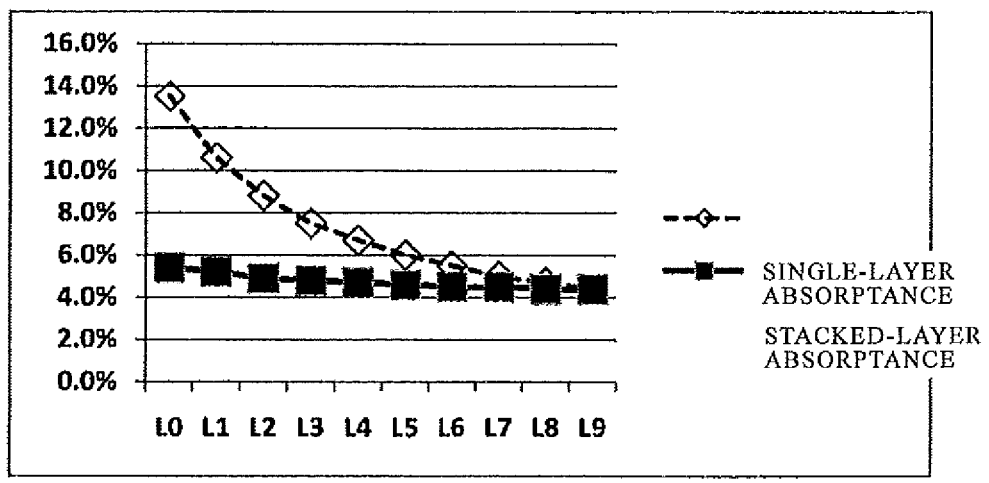

In another reference example shown in FIGS. 20A-20C, all the L0 to L9 recording and reading layers 14A to 14J may have stacked-layer reflectances approximate to each other. This necessitates individual settings of the single-layer reflectances and absorptances of the L0 to L9 recording and reading layers 14A to 14J, leading to considerably complicated manufacturing processes. As a result, a manufacturing error becomes influential and design to be made should leave room for the error and others, making it difficult to increase the number of stacked layers.

Accordingly, in the first embodiment, the L0 to L9 recording and reading layers 14A to 14J are divided into the plurality of recording and reading layer groups 13A and 13B, and a stacked-layer reflectance sequentially decreases in the order from the front side toward the back side with respect to the light incident surface in each of the recording and reading layer groups 13A and 13B. Further, regarding the L4 and L3 recording and reading layers 14E and 14D adjacent to each other at the boundary between the recording and reading layer groups 13A and 13B, the L3 recording and reading layer 14D nearer the back side has a higher stacked-layer reflectance. As a result, in the first recording and reading layer group 13A, a stacked-layer reflectance can decrease sequentially in the order toward the back side with respect to the L3 recording and reading layer 14D having a high stacked-layer reflectance. This makes it possible to make a difference small between the stacked-layer reflectance of the L9 recording and reading layer 14J nearest the light incident surface and that of the L0 recording and reading layer 14A farthest from the light incident surface. More specifically, regarding the stacked-layer reflectances of all the L0 to L9 recording and reading layers 14A to 14J, the highest stacked-layer reflectance is five times or less the smallest stacked-layer reflectance. It is preferable that the highest stacked-layer reflectance be four times or less, and more preferably, three times or less the smallest stacked-layer reflectance. In the first embodiment, the highest stacked-layer reflectance is smaller than a reflectance that is less than three times the smallest stacked-layer reflectance (2.5 times or less the smallest stacked-layer reflectance) even when the number of the actually stacked layers is ten.

The aforementioned stacked structure makes it possible to dispose recording and reading layers of the same film thickness made of the same material one above the other in each of the recording and reading layer groups 13A and 13B. Accordingly, conditions for film deposition are not required to be determined separately for the recording and reading layers, allowing significant reduction of a design burden and a manufacturing burden. Further, the variation in conditions for recording and reading may be small in a recording and reading unit as substantially the same recording and reading layers are stacked in each of the recording and reading layer groups 13A and 13B, making it possible to simplify recording and reading control (recording strategy). If recording and reading layers of various types having different single-layer reflectances and single-layer absorptances are disposed one above the other in a complicated manner, optimum recording and reading control should be found empirically with great difficulty.

The interlayer crosstalk is likely to occur between the L4 and L3 recording and reading layers 14E and 14D having stacked-layer reflectances of a reversed order as described above. In response, in the first embodiment, the fourth intermediate layer 16D disposed between the first and second recording and reading layer groups 13A and 13B is set to have a film thickness of 16 µm greater than the other of the two film thicknesses of intermediate layers. Accordingly, the film thickness of the fourth intermediate layer 16D can also suppress the interlayer crosstalk.

In the multilayer optical recording medium 10, intermediate layers of a first film thickness (12 µm) and intermediate layers of a second film thickness (16 µm) which is larger than the first film thickness are alternately disposed one above the other while the respective recording and reading layers 14A to 14J are interposed between the intermediate layers.

By referring to the confocal crosstalk phenomena shown in FIGS. 15 to 18, the amounts of light of the beams 71 to 73 reflected off multiple surfaces are generally smaller than that of the beam 70, for example. Meanwhile, the beams 71 to 73 enter the photodetector with the same optical path length and with the same radius of light flux, generating rather influential interference. Accordingly, the amount of light received by the photodetector varies largely in response to the minute change of an interlayer thickness, making it difficult to detect a stable signal.

A design technique of the multilayer optical recording medium 10 will be described below.

In the multilayer optical recording medium 10, intermediate layers of two film thicknesses of 10 µm or more are alternately disposed to reduce the effects of the interlayer crosstalk and the confocal crosstalk at the same time. An intermediate layer of a film thickness greater than the other of the two film thicknesses is used to further reduce the interlayer crosstalk at the boundary between the first and second recording and reading layer groups 13A and 13B. Thus, the intermediate layer disposed between the recording and reading layer groups 13A and 13B is designed to have a greater thickness while the intermediate layers of the two types are alternately disposed in consideration of the number of stacked recording and reading layers to belong to each of the recording and reading layer groups 13A and 13B, and the number of intermediate layers.

The L4 to L9 recording and reading layers 14E to 14J nearer the light incident surface have the same structure to enhance convenience. Further, the four L0 to L3 recording and reading layers 14A to 14D farther from the light incident surface are also recording films of the same structure to enhance convenience while they are designed to have a single-layer reflectance higher than that of the six layers nearer the front side. If recording and reading layers of the same structure are disposed one above the other, the amount of light returning to the photodetector 732 after being reflected off each of the stacked recording and reading layers naturally decreases in proportion to the square of the transmittance of the recording and reading layer as the recording and reading layer goes farther to the back side from the light incident surface. Further, laser power reaching each of the recording and reading layers naturally decreases in proportion to the transmittance of the recording and reading layer as the recording and reading layer goes farther to the back side from the light incident surface.

An example of division into groups of recording and reading layers is described next. First, a specific condition for film deposition (second condition for film deposition) is determined for recording and reading layers near the light incident surface, and the recording and reading layers are sequentially disposed one above the other with respect to the light incident surface. When reading power at a level not causing reading degradation is applied to the recording and reading layers, the amount of light returning to the photodetector 732 after being reflected off each recording and reading layer approaches a limit value of handling by an evaluation unit, or a limit value of laser power (limit value of recording sensitivity) required for formation of a recording mark in a recording and reading layer (alteration of a recording layer) is approached. The number of the aforementioned recording and reading layers to be stacked can be increased to a number by which the amount of reflected light approaches one of these limit values. If a recording and reading layer nearest the back side achieves the aforementioned limit values of the reflected light and the recording sensitivity, the recording and reading layers stacked so far are categorized in a group of recording and reading layers. In the present embodiment, the L9 to L4 recording and reading layers 14J to 14E are categorized in the second recording and reading layer group 13B.

A next process is to design recording and reading layers to be disposed one above the other on a side nearer the back side than the second recording and reading layer group 13B. The aforementioned limit values of the amount of reflected light and the recording sensitivity are exceeded if the condition for film deposition applied for the second recording and reading layer group 13B is also applied here. Accordingly, in order for these limit values not to be exceeded, a next condition for film deposition (first condition for film deposition) is determined such that recording and reading layers have a higher single-layer reflectance and a higher single-layer absorptance. Recording and reading layers satisfying this condition are sequentially disposed one above the other to get nearer the back side. Like the second recording and reading layer group 13B, the number of the recording and reading layers to be stacked can be increased to a number by which the amount of reflected light reaches a limit value of handling by the evaluation unit, or a limit value of laser power is reached. Or, the number of the recording and reading layers to be stacked may also be increased to a target number. These recording and reading layers are categorized in a group of recording and reading layers after the intended number of recording and reading layers are disposed one above the other. In the present embodiment, the L3 to L0 recording and reading layers 14D to 14A are categorized in the first recording and reading layer group 13A. A target number of stacked layers is ten in the first embodiment. Accordingly, the target is attained when the first recording and reading layer group 13A is formed. As is described in more detail later, if a larger number of layers are to be disposed one above the other, a new condition for film deposition may be determined such that recording and reading layers have a still higher single-layer reflectance and a still higher single-layer absorptance. Then, these recording and reading layers are disposed one above the other to get nearer the back side, and are categorized in a new group of recording and reading layers.

Then, recording and reading layers before and after the change point of a material component that are, for example, the L4 and L3 recording and reading layers 14E and 14D are compared. A result of the comparison reveals that the amount of light returning to the photodetector 732 after being reflected off the L3 recording and reading layer 14D is larger than that returning to the photodetector 732 after being reflected off the L4 recording and reading layer 14E. This difference between the amounts of reflected light is larger than a difference between recording and reading layers formed under the same condition for film deposition in each of the recording and reading layer groups 13A and 13B. Making a difference larger in the amount of reflected light between the recording and reading layers before and after the change point for a material component allows a larger number of recording and reading layers to be categorized in the first recording and reading layer group 13A nearer the back side. Meanwhile, the L4 recording and reading layer 14E of a smaller amount of reflected light receives interlayer stray light from the L3 recording and reading layer 14D having a larger single-layer reflectance and providing a larger amount of reflected light to return to the photodetector 732. This interlayer stray light considerably affects the signal quality and the servo characteristics of the L4 recording and reading layer 14E. Accordingly, it is important to make the aforementioned difference in the amount of reflected light smaller than a difference between the highest and lowest stacked-layer reflectances in the second recording and reading layer group 13B nearer the light incident surface. In the present embodiment, an intermediate layer with a thickness of 16 μm greater than the other of the two film thicknesses of intermediate layers is disposed between the L4 and L3 recording and reading layers 14E and 14D in consideration of the generation of the interlayer crosstalk.

Figure 6A:
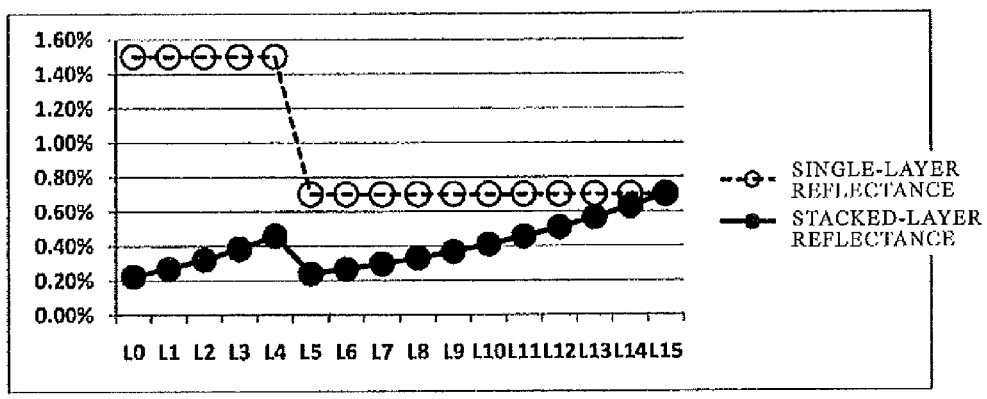
Figure 6B:
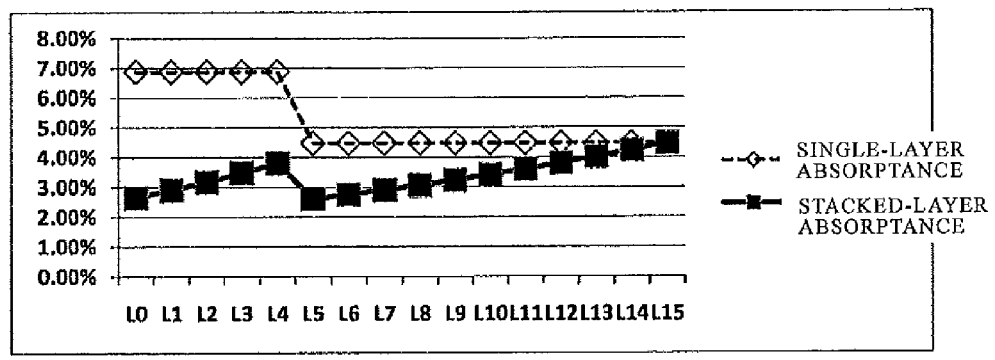

A multilayer optical recording medium 110 according to a second embodiment of the present invention will next be described with reference to FIGS. 5 and 6. Components described below are denoted by reference numerals with the last two digits common to those of the reference numerals given to the corresponding components of the multilayer optical recording medium of the first embodiment. Accordingly, the structure of the multilayer optical recording medium 110 including a sectional view is not shown in the drawings.

As shown in FIG. 5, the multilayer optical recording medium 110 has a stacked structure with 16 layers including L0 to L15 recording and reading layers 114A to 114P disposed one above the other in the order from a back side with respect to a light incident surface. First to fifteenth intermediate layers 116A to 116O are disposed one above the other between the L0 to L15 recording and reading layers 114A to 114P.

The multilayer optical recording medium 110 has first and second recording and reading layer groups 113A and 113B. As shown in FIG. 6, the first and second recording and reading layer groups 113A and 113B each include a plurality of recording and reading layers successively disposed one above the other in the order in which the layers are stacked. The stacked-layer reflectance of each one of the recording and reading layers in each of the recording and reading layer groups 113A and 113B decreases in the order from a front side near the light incident surface toward a back side far from the light incident surface.

More specifically, the first recording and reading layer group 113A has a five-layered structure with the L0 to L4 recording and reading layers 114A to 114E. The second recording and reading layer group 113B has an eleven-layered structure with the L5 to L15 recording and reading layers 114F to 114P.

The first and second recording and reading layer groups 113A and 113B are adjacent to each other with an intermediate layer interposed therebetween. Regarding the adjacent first and second recording and reading layer groups 113A and 113B, the L4 recording and reading layer 114E nearest the front side with respect to the light incident surface in the first recording and reading layer group 113A nearer the back side has a stacked-layer reflectance higher than that of the L5 recording and reading layer 114F nearest the back side in the second recording and reading layer group 113B nearer the front side.

Film design to achieve the aforementioned stacked-layer reflectance is such that the L0 to L4 recording and reading layers 114A to 114E belonging to the first recording and reading layer group 113A each have a first single-layer reflectance that is the reflectance of each the L0 to L4 recording and reading layers 114A to 114E as a single layer (hereinafter called single-layer reflectance), and a first single-layer absorptance that is the absorptance of each of the L0 to L4 recording and reading layers 114A to 114E as a single layer (hereinafter called single-layer absorptance). To be specific, the first single-layer reflectance is set to 1.5%, and the first single-layer absorptance is set to 6.9%.

The L5 to L15 recording and reading layers 114F to 114P belonging to the second recording and reading layer group 113B nearer the light incident surface each have a second single-layer reflectance and a second single-layer absorptance smaller than the first single-layer reflectance and the first single-layer absorptance. To be specific, the second single-layer reflectance is set to 0.7%, and the second single-layer absorptance is set to 4.5%.

As described above, in the second embodiment, the L0 to L4 recording and reading layers 114A to 114E in the first recording and reading layer group 113A have substantially the same single-layer reflectance and the single-layer absorptance. Further, the L5 to L15 recording and reading layers 114F to 114P in the second recording and reading layer group 113B have substantially the same single-layer reflectance and the single-layer absorptance. Thus, the stacked-layer reflectance decreases sequentially in the order with respect to the light incident surface in each of the first and second recording and reading layer groups 113A and 113B. Further, the single-layer reflectance in the first recording and reading layer group 113A is higher than that in the second recording and reading layer group 113B, and accordingly, this makes the stacked-layer reflectance of the L4 recording and reading layer 114E higher than that of the L5 recording and reading layer 114F.

A first distance T1 (12 μm) of 10 μm or more, and a second distance T2 (16 μm) greater than the first distance T1 by 3 μm or more, are alternately set as the film thicknesses of the intermediate layers 116A to 116O. In the multilayer optical recording medium 110, the first, second, third, fourth, fifth, sixth, and other intermediate layers 116A, 116B, 116C, 116D, 116E, 116F, and the other arranged in this order as viewed from the back side have film thicknesses of 16 μm and 12 μm that are repeatedly employed in this order. That is, the intermediate layers of the two film thicknesses (16 μm and 12 μm) are alternately stacked.

Further, in the second embodiment, the fifth intermediate layer 116E interposed between the first and second recording and reading layer groups 113A and 113B has the second distance T2 (16 μm) corresponding to the greater film thickness. This means that the fifth intermediate layer 116E has a film thickness greater than those of the fourth and sixth intermediate layers 116D and 116F adjacent to the fifth intermediate layer 116E while the L4 and L5 recording and reading layers 114E and 114F on the opposite sides are respectively disposed therebetween. As already described above, regarding the L4 and L5 recording and reading layers 114E and 114F, the L4 recording and reading layer 114E nearer the back side has a higher stacked-layer reflectance (the order of stacked-layer reflectances is reversed), resulting in a high probability of generation of interlayer crosstalk. In response, the fifth intermediate layer 116E interposed between the L4 and L5 recording and reading layers 114E and 114F has a greater film thickness to reduce the interlayer crosstalk.

The second embodiment makes a difference small between the stacked-layer reflectance of the L15 recording and reading layer 114P nearest the light incident surface and that of the L0 recording and reading layer 114A farthest from the light incident surface. More specifically, regarding the stacked-layer reflectances of all the L0 to L15 recording and reading layers 114A to 114P, the highest stacked-layer reflectance is five times or less the smallest stacked-layer reflectance. It is preferable that the highest stacked-layer reflectance be four times or less, and more preferably, three times or less the smallest stacked-layer reflectance. The highest stacked-layer reflectance is actually smaller than a reflectance that is less than four times the smallest stacked-layer reflectance even when the number of the stacked layers is sixteen.

The aforementioned stacked structure makes it possible to dispose recording and reading layers of the same film thickness made of the same material one above the other in each of the recording and reading layer groups of 113A and 113B. This allows significant reduction of a design burden and a manufacturing burden. Further, the variation in conditions for recording and reading may be small in a recording and reading unit as the recording and reading layers having substantially the same characteristics are stacked in each of the recording and reading layer groups 113A and 113B, making it possible to simplify recording and reading control.

Figure 8A:
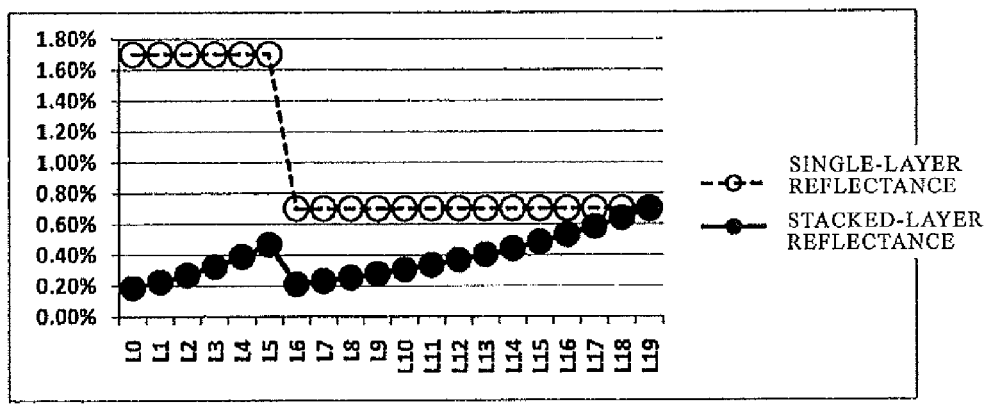
Figure 8B:
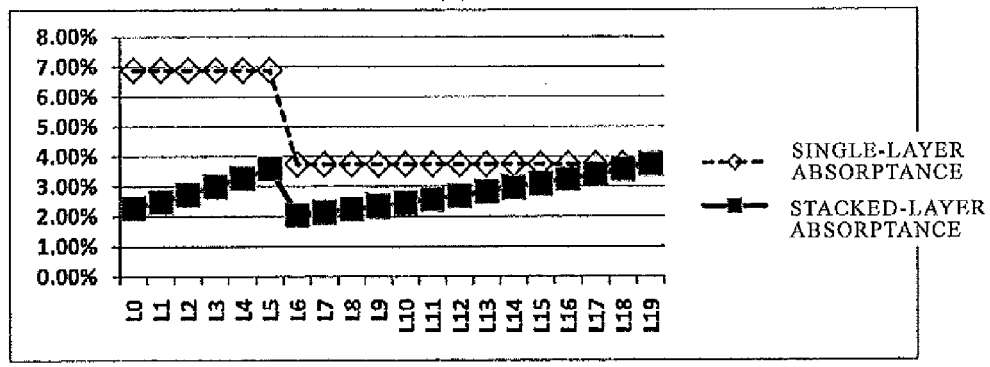

A multilayer optical recording medium 210 according to a third embodiment of the invention will next be described with reference to FIGS. 7 and 8. Components described below are denoted by reference numerals with the last two digits common to those of the reference numerals given to the corresponding components of the multilayer optical recording medium of the first embodiment. Accordingly, the structure of the multilayer optical recording medium 210 including a sectional view is not shown in the drawings.

As shown in FIG. 7, the multilayer optical recording medium 210 has a stacked structure with 20 layers including L0 to L19 recording and reading layers 214A to 214T disposed one above the other in the order from a back side with respect to a light incident surface. First to nineteenth intermediate layers 216A to 216S are disposed one above the other between the L0 to L19 recording and reading layers 214A to 214T.

The multilayer optical recording medium 210 has first and second recording and reading layer groups 213A and 213B. As shown in FIG. 8, the first and second recording and reading layer groups 213A and 213B each include a plurality of recording and reading layers successively disposed one above the other in the order in which the layers are stacked. The stacked-layer reflectance of each one of the recording and reading layers in each of the recording and reading layer groups 213A and 213B decreases in the order from a front side near the light incident surface toward a back side far from the light incident surface.

More specifically, the first recording and reading layer group 213A has a six-layered structure with the L0 to L5 recording and reading layers 214A to 214F. The second recording and reading layer group 213B has a fourteen-layered structure with the L6 to L19 recording and reading layers 214G to 214T.

The first and second recording and reading layer groups 213A and 213B are adjacent to each other with an intermediate layer interposed therebetween. Regarding the adjacent first and second recording and reading layer groups 213A and 213B, the L5 recording and reading layer 214F nearest the front side with respect to the light incident surface in the first recording and reading layer group 213A nearer the back side has a stacked-layer reflectance higher than that of the L6 recording and reading layer 214G nearest the back side in the second recording and reading layer group 213B nearer the front side.

Film design to achieve the aforementioned stacked-layer reflectance is such that the L0 to L5 recording and reading layers 214A to 214F belonging to the first recording and reading layer group 213A each have a first single-layer reflectance that is the reflectance of the L0 to L5 recording and reading layers 214A to 214F as a single layer (hereinafter called single-layer reflectance), and a first single-layer absorptance that is the absorptance of the L0 to L5 recording and reading layers 214A to 214F as a single layer (hereinafter called single-layer absorptance). To be specific, the first single-layer reflectance is set to 1.7%, and the first single-layer absorptance is set to 6.9%.

The L6 to L19 recording and reading layers 214G to 214T belonging to the second recording and reading layer group 213B nearer the light incident surface each have a second single-layer reflectance and a second single-layer absorptance smaller than the first single-layer reflectance and the first single-layer absorptance. To be specific, the second single-layer reflectance is set to 0.7%, and the second single-layer absorptance is set to 3.7%. As described above, in the present embodiment, the single-layer reflectance and the single-layer absorptance are substantially the same in each of the first and second recording and reading layer groups 213A and 213B. Thus, the stacked-layer reflectance decreases sequentially in the order with respect to the light incident surface in each of the first and second recording and reading layer groups 213A and 213B. Further, the single-layer reflectance in the first recording and reading layer group 213A is higher than that in the second recording and reading layer group 213B and accordingly, this makes the stacked-layer reflectance of the L5 recording and reading layer 214F higher than that of the L6 recording and reading layer 214G.

A first distance T1 (12 μm) of 10 μm or more, and a second distance T2 (16 μm) greater than the first distance T1 by 3 μm or more, are alternately set as the film thicknesses of the intermediate layers 216A to 216S. In the multilayer optical recording medium 210, the first, second, third, fourth, fifth, sixth, and the other intermediate layers 216A, 216B, 216C, 216D, 216E, 216F, and the other arranged in this order as viewed from the back side have film thicknesses of 12 μm and 16 μm that are repeatedly employed in this order. That is, the intermediate layers of the two film thicknesses (16 μm and 12 μm) are alternately disposed one above the other.

Further, in the third embodiment, the sixth intermediate layer 216F interposed between the first and second recording and reading layer groups 213A and 213B has the second distance T2 (16 μm) corresponding to the greater film thickness. As already described above, regarding the L5 and L6 recording and reading layers 214F and 214G, the L5 recording and reading layer 214F nearer the back side has a higher stacked-layer reflectance (the order of stacked-layer reflectances is reversed), resulting in a high probability of generation of interlayer crosstalk. In response, the sixth intermediate layer 216F interposed between the L5 and L6 recording and reading layers 214F and 214G has a greater film thickness to reduce the interlayer crosstalk.

The third embodiment makes a difference small between the stacked-layer reflectance of the L19 recording and reading layer 214T nearest the light incident surface and that of the L0 recording and reading layer 214A farthest from the light incident surface. More specifically, regarding the stacked-layer reflectances of all the L0 to L19 recording and reading layers 214A to 214T, the highest stacked-layer reflectance is five times or less the smallest stacked-layer reflectance. It is preferable that the highest stacked-layer reflectance be four times or less, and more preferably, three times or less the smallest stacked-layer reflectance. The highest stacked-layer reflectance is actually smaller than a reflectance that is four times the smallest stacked-layer reflectance even when the number of the stacked layers is twenty.

The aforementioned stacked structure makes it possible to dispose recording and reading layers of the same film thickness made of the same material one above the other in each of the recording and reading layer groups 213A and 213B. This allows significant reduction of a design burden and a manufacturing burden. Further, the variation in conditions for recording and reading may be small in a recording and reading unit as the recording and reading layers having substantially the same characteristics are stacked in each of the recording and reading layer groups 213A and 213B, making it possible to simplify recording and reading control.

Figure 10A:
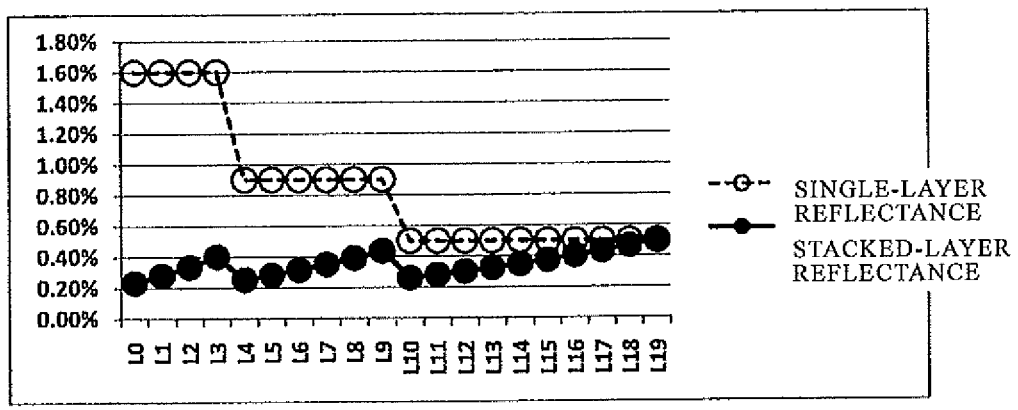
Figure 10B:
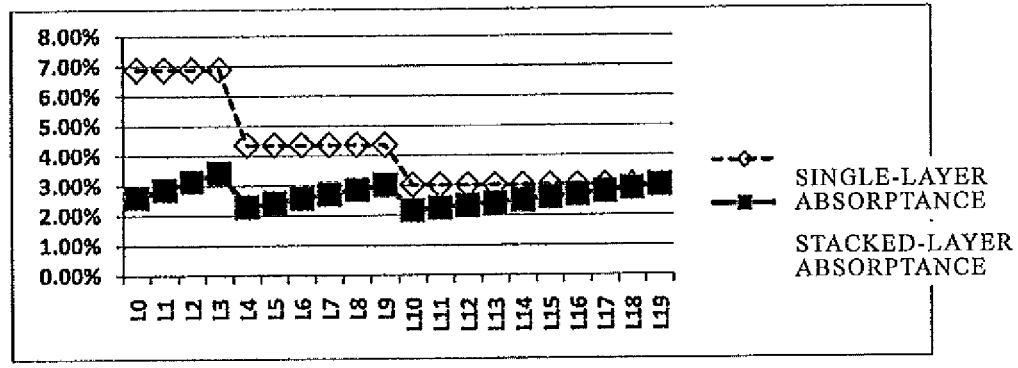

A multilayer optical recording medium 310 according to a fourth embodiment of the invention will next be described with reference to FIGS. 9 and 10. Components described below are denoted by reference numerals with the last two digits common to those of the reference numerals given to the corresponding components of the multilayer optical recording medium of the first embodiment. Accordingly, the structure of the multilayer optical recording medium 310 including a sectional view is not shown in the drawings.

As shown in FIG. 9, the multilayer optical recording medium 310 has a stacked structure with 20 layers including L0 to L19 recording and reading layers 314A to 314T disposed one above the other in the order from a back side with respect to a light incident surface. First to nineteenth intermediate layers 316A to 316S are disposed one above the other between the L0 to L19 recording and reading layers 314A to 314T.

The multilayer optical recording medium 310 has first, second and third recording and reading layer groups 313A, 313B and 313C. As shown in FIG. 10, the first to third recording and reading layer groups 313A to 313C each include a plurality of recording and reading layers successively disposed one above the other in the order in which the layers are stacked. The stacked-layer reflectance of each one of the recording and reading layers in each of the recording and reading layer groups 313A to 313C decreases in the order from a front side near the light incident surface toward a back side far from the light incident surface.

More specifically, the first recording and reading layer group 313A has a four-layered structure with the L0 to L3 recording and reading layers 314A to 314D. The second recording and reading layer group 313B has a six-layered structure with the L4 to L9 recording and reading layers 314E to 314J. The third recording and reading layer group 313C has a ten-layered structure with the L10 to L19 recording and reading layers 314K to 314T.

The first and second recording and reading layer groups 313A and 313B are adjacent to each other with the fourth intermediate layer 316D interposed therebetween. Regarding the adjacent first and second recording and reading layer groups 313A and 313B, the L3 recording and reading layer 314D nearest the front side with respect to the light incident surface in the first recording and reading layer group 313A nearer the back side has a stacked-layer reflectance higher than that of the L4 recording and reading layer 314E nearest the back side in the second recording and reading layer group 313B nearer the front side. The second and third recording and reading layer groups 313B and 313C are adjacent to each other with the tenth intermediate layer 316J interposed therebetween. Regarding the adjacent second and third recording and reading layer groups 313B and 313C, the L9 recording and reading layer 314J nearest the front side with respect to the light incident surface in the second recording and reading layer group 313B nearer the back side has a stacked-layer reflectance higher than that of the L10 recording and reading layer 314K nearest the back side in the third recording and reading layer group 313C nearer the front side.

Film design to achieve the aforementioned stacked-layer reflectance is such that the L0 to L3 recording and reading layers 314A to 314D belonging to the first recording and reading layer group 313A each have a first single-layer reflectance that is the reflectance of each of the L0 to L3 recording and reading layers 314A to 314D as a single layer (hereinafter called single-layer reflectance), and a first single-layer absorptance that is the absorptance of each of the L0 to L3 recording and reading layers 314A to 314D as a single layer (hereinafter called single-layer absorptance). To be specific, the first single-layer reflectance is set to 1.6%, and the first single-layer absorptance is set to 6.9%. The L4 to L9 recording and reading layers 314E to 314J belonging to the second recording and reading layer group 313B each have a second single-layer reflectance and a second single-layer absorptance smaller than the first single-layer reflectance and the first single-layer absorptance. To be specific, the second single-layer reflectance is set to 0.9%, and the second single-layer absorptance is set to 4.4%. Further, the L10 to L19 recording and reading layers 314K to 314T belonging to the third recording and reading layer group 313C each have a third single-layer reflectance and a third single-layer absorptance smaller than the second single-layer reflectance and the second single-layer absorptance. To be specific, the third single-layer reflectance is set to 0.5%, and the third single-layer absorptance is set to 3.0%.

As described above, in the present embodiment, single-layer reflectances and single-layer absorptances are substantially the same in each of the first to third recording and reading layer groups 313A to 313C. Thus, the stacked-layer reflectance decreases sequentially in the order with respect to the light incident surface in each of the first to third recording and reading layer groups 313A to 313C.

A single-layer reflectance is higher in the second recording and reading layer group 313B than in the third recording and reading layer group 313C. Further, a single-layer reflectance is higher in the first recording and reading layer group 313A than in the second recording and reading layer group 313B. Accordingly, at each of the boundaries between the recording and reading layer groups 313A to 313C, a stacked-layer reflectance is higher on a side nearer the back side than on a side nearer the front side.

A first distance T1 (12 μm) of 10 μm or more, and a second distance T2 (16 μm) greater than the first distance T1 by 3 μm or more, are alternately set as the film thicknesses of the intermediate layers 316A to 316S. In the multilayer optical recording medium 310, the first, second, third, fourth, fifth, sixth, and the other intermediate layers 316A, 316B, 316C, 316D, 316E, 316F, and the other arranged in this order as viewed from the back side have film thicknesses of 12 μm and 16 μm that are repeatedly employed in this order. That is, the intermediate layers of the two film thicknesses (16 μm and 12 μm) are alternately disposed one above the other.

Further, in the present embodiment, the fourth intermediate layer 316D interposed between the first and second recording and reading layer groups 313A and 313B has the second distance T2 (16 μm) corresponding to the greater film thickness. The tenth intermediate layer 316J interposed between the second and third recording and reading layer groups 313B and 313C also has the second distance T2 (16 μm) corresponding to the greater film thickness. In order to achieve these settings, it is preferred that the second recording and reading layer group 313B disposed midway between the first recording and reading layer group 313A nearest the back side and the third recording and reading layer group 313C nearest the front side, except the first and third recording and reading layer groups 313A and 313C, have an even number of stacked layers (in the fourth embodiment, six layers).

As already described above, regarding the L3 and L4 recording and reading layers 314D and 314E, the L3 recording and reading layer 314D nearer the back side has a higher stacked-layer reflectance (the order of stacked-layer reflectances is reversed), resulting in a high probability of generation of interlayer crosstalk. Likewise, regarding the L9 and L10 recording and reading layers 314J and 314K, the L9 recording and reading layer 314J nearer the back side has a higher stacked-layer reflectance (the order of stacked-layer reflectances is reversed), resulting in a high probability of generation of the interlayer crosstalk. In response, the fourth and tenth intermediate layers 316D and 316J interposed between the L3 and L4 recording and reading layers 314D and 314E, and between the L9 and L10 recording and reading layers 314J and 314K, respectively, have a greater film thickness to reduce the interlayer crosstalk.

In particular, the present embodiment makes it possible to make a difference small between the stacked-layer reflectance of the L19 recording and reading layer 314T nearest the light incident surface and that of the L0 recording and reading layer 314A farthest from the light incident surface even when the number of stacked layers is twenty. More specifically, regarding the stacked-layer reflectances of all the L0 to L19 recording and reading layers 314A to 314T, the highest stacked-layer reflectance is five times or less the smallest stacked-layer reflectance. It is preferable that the highest stacked-layer reflectance be four times or less, and more preferably, three times or less the smallest stacked-layer reflectance. In particular, dividing the recording and reading layers into the three groups makes the highest stacked-layer reflectance be three times or less the smallest stacked-layer reflectance despite the structure with stacked 20 layers.

The aforementioned stacked structure makes it possible to dispose recording and reading layers of the same film thickness made of the same material one above the other in each of the recording and reading layer groups 313A, 313B and 313C. This allows significant reduction of a design burden and a manufacturing burden. Further, the variation in conditions for recording and reading may be small in a recording and reading unit as the recording and reading layers having substantially the same characteristics are stacked in each of the recording and reading layer groups 313A, 313B and 313C, making it possible to simplify recording and reading control.

A multilayer optical recording medium 410 according to a fifth embodiment of the invention will next be described with reference to FIG. 11. Components described below are denoted by reference numerals with the last two digits common to those of the reference numerals given to the corresponding components of the multilayer optical recording medium of the first embodiment. Accordingly, the structure of the multilayer optical recording medium 410 including a sectional view is not shown in the drawings.

The multilayer optical recording medium 410 has a stacked structure with 16 layers including L0 to L15 recording and reading layers 414A to 414P disposed one above the other in the order from a back side with respect to a light incident surface. First to fifteenth intermediate layers 416A to 416O are disposed one above the other between the L0 to L15 recording and reading layers 414A to 414P.

The multilayer optical recording medium 410 has first and second recording and reading layer groups 413A and 413B. The first and second recording and reading layer groups 413A and 413B each include a plurality of recording and reading layers successively disposed one above the other in the order in which the layers are stacked. The stacked-layer reflectance of each one of the recording and reading layers in each of the recording and reading layer groups 413A and 413B decreases in the order from a front side near the light incident surface toward a back side far from the light incident surface.

More specifically, the first recording and reading layer group 413A has a five-layered structure with the L0 to L4 recording and reading layers 414A to 414E. The second recording and reading layer group 413B has an eleven-layered structure with the L5 to L15 recording and reading layers 414F to 414P.

The first and second recording and reading layer groups 413A and 413B are adjacent to each other with an intermediate layer interposed therebetween. Regarding the adjacent first and second recording and reading layer groups 413A and 413B, the L4 recording and reading layer 414E nearest the front side with respect to the light incident surface in the first recording and reading layer group 413A nearer the back side has a stacked-layer reflectance higher than that of the L5 recording and reading layer 414F nearest the back side in the second recording and reading layer group 413B nearer the front side. Although not specifically shown in the drawings, film design to achieve the aforementioned stacked-layer reflectance is such that the L0 to L4 recording and reading layers 414A to 414E belonging to the first recording and reading layer group 413A each have a single-layer reflectance of 1.5% and a single-layer absorptance of 6.9%.

The L5 to L15 recording and reading layers 414F to 414P belonging to the second recording and reading layer group 413B nearer the light incident surface each have a single-layer reflectance of 0.7% and a single-layer absorptance of 4.5%. As described above, in the present embodiment, the L0 to L4 recording and reading layers 414A to 414E in the first recording and reading layer group 413A have substantially the same single-layer reflectance and the single-layer absorptance. Further, the L5 to L15 recording and reading layers 414F to 414P in the second recording and reading layer group 413B have substantially the same single-layer reflectance and the single-layer absorptance. Thus, the stacked-layer reflectance decreases sequentially in the order with respect to the light incident surface in each of the first and second recording and reading layer groups 413A and 413B. Further, the single-layer reflectance in the first recording and reading layer group 413A is higher than that in the second recording and reading layer group 413B, and accordingly, this makes the stacked-layer reflectance of the L4 recording and reading layer 414E higher than that of the L5 recording and reading layer 414F.

A first distance T1 (12 μm) of 10 μm or more, and a second distance T2 (16 μm) greater than the first distance T1 by 3 μm or more, are alternately set as the film thicknesses of the intermediate layers 416A to 416O.

In particular, in the multilayer optical recording medium 410, only the fifth intermediate layer 416E interposed between the first and second recording and reading layer groups 413A and 413B has the second distance T2 (16 μm) corresponding to the greater film thickness, while the other intermediate layers have the first distance T1 (12 μm). This means that the film thicknesses of the intermediate layers in the recording and reading layer groups 413A and 413A are all 12 μm.

Thus, the fifth intermediate layer 416E has a film thickness greater than those of the fourth and sixth intermediate layers 416D and 416F adjacent to the fifth intermediate layer 416E with the L4 and L5 recording and reading layers 414E and 414F on the opposite sides respectively disposed therebetween. As already described above, regarding the L4 and L5 recording and reading layers 414E and 414F, the L4 recording and reading layer 414E nearer the back side has a higher stacked-layer reflectance (the order of stacked-layer reflectances is reversed), resulting in a high probability of generation of interlayer crosstalk. In response, the fifth intermediate layer 416E interposed between the L4 and L5 recording and reading layers 414E and 414F has a greater film thickness to reduce the interlayer crosstalk.

EXAMPLE AND COMPARATIVE EXAMPLE

Figure 12A:
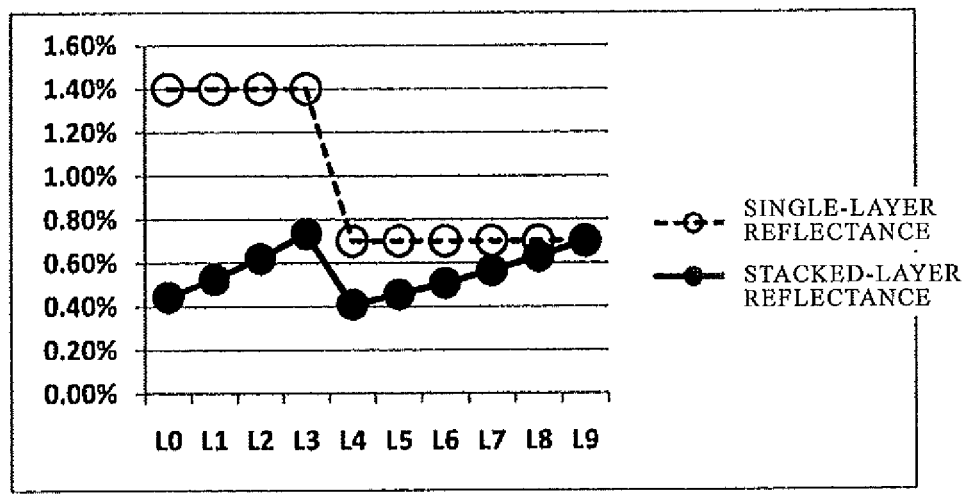
Figure 12B:
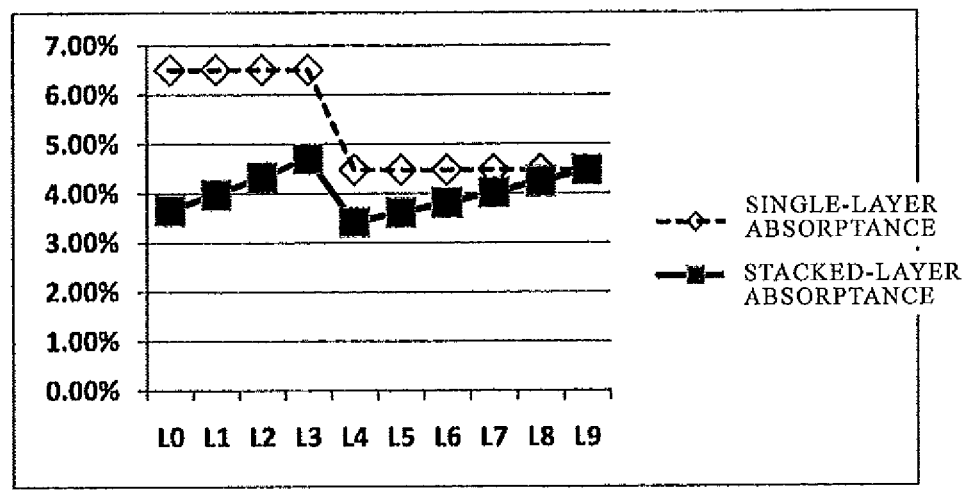

The multilayer optical recording medium 10 according to the first embodiment (of a 2-block type managed under number B) was formed under the following conditions. The reflectance and absorptance of each of recording films as a single layer forming the six layers nearer the front side were set at 0.7% and 4.5%, respectively, and the reflectance and absorptance of each of recording films as a single layer forming the four layers nearer the back side were set at 1.4% and 6.5%, respectively. The stacked-layer reflectances and stacked-layer absorptances of Example are shown in FIGS. 12A-12C. Information was recorded in the multilayer optical recording medium 10 while recording power was controlled with an optical pickup 90, and reading light from the multilayer optical recording medium 10 was evaluated.

Turning to a multilayer optical recording medium given as Comparative Example (of a normal type managed under number A), recording and reading layers were designed in a conventional manner such that the amounts of light reflected off the stacked recording and reading layers and returning to the photodetector 732, and laser power levels reaching the recording and reading layers would be substantially the same in the respective recording and reading layers. In Comparative Example, the stacked-layer reflectances and stacked-layer absorptances are the same as those shown in FIGS. 20A-20C, and intermediate layers have the same structure as that in Example.

Figure 13H:
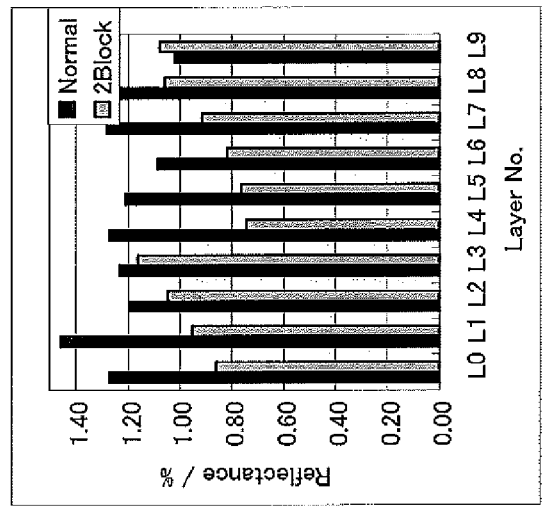
Figure 13G:
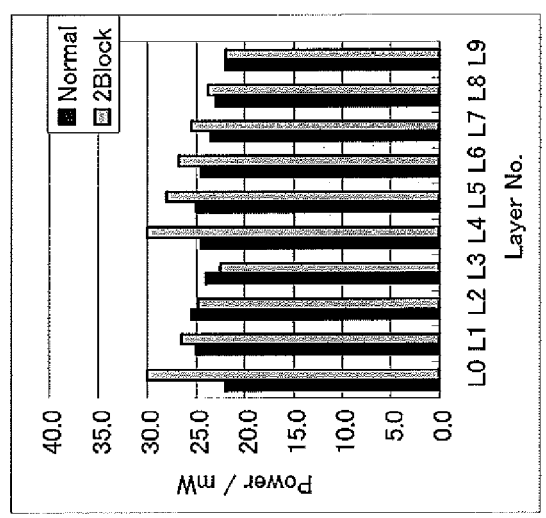

In Example, as shown in FIG. 13D and FIG. 13G, conditions for recording power of the optical pickup 90 were determined such that the recording power would increase in each of the recording and reading layer groups 13A and 13B in the order from the front side toward the back side. The condition was also controlled such that the recording power would decrease at the change point from the second recording and reading layer group 13B to the first recording and reading layer group 13A. More specifically, in the second recording and reading layer group 13B, the recording power was controlled to increase sequentially from 22.0 mW applied to the L9 recording and reading layer 14J nearest the light incident surface to 30.0 mW applied to the L4 recording and reading layer 14E nearest the back side. The recording power was also controlled in the first recording and reading layer group 13A to increase sequentially from 22.5 mW applied to the L3 recording and reading layer 14D nearest the light incident surface that is lower than that applied to the L4 recording and reading layer 14E to 30.0 mW applied to the L0 recording and reading layer 14A nearest the back side. That is, the recording power was controlled such that it would reversely correlate with the stacked-layer reflectance of the recording and reading layer group 14. Further, the linear density of a recording signal was set at 25 GB, and a recording speed was set at BD 1× (36 Mbps).

As shown in FIG. 13D and FIG. 13G, in the multilayer optical recording medium of Comparative Example, recording power was controlled as necessary according to the characteristics of each recording and reading layer such that substantially the same recording power would be applied to the recording and reading layers.

Signals recorded under the aforementioned conditions were read by applying reading power of 3.0 mW common to Example and Comparative Example to obtain resultant reading signals. Evaluation results of the reading signals are shown in FIGS. 13A-13C.

As seen from the results, the multilayer optical recording medium 10 of Example (FIG. 13B) and the multilayer optical recording medium of Comparative Example (FIG. 13A) achieved comparable results regarding jitter. It is particularly seen that in each of Example and Comparative Example, a practicable signal quality was obtained in the L4 and L3 recording and reading layers 14E and 14D at the boundary between the recording and reading layer groups 13A and 13B. In particular, as shown in FIG. 13H, the L4 recording and reading layer 14E provides a small amount of reflected light as the stacked-layer reflectance thereof was reduced to get closer to its lower limit that can be evaluated practically as described in the design technique. Nevertheless, the L4 recording and reading layer 14E achieves stable focusing and tracking servo, and does not suffer from considerable degradation of signal characteristics including jitter as compared to the other recording and reading layers. It is also seen that Example provides a better signal quality of the recording and reading layer group (L0 to L3 recording and reading layers 14A to 14D) nearer the back side with respect to the light incident surface than Comparative Example.

Figure 14:
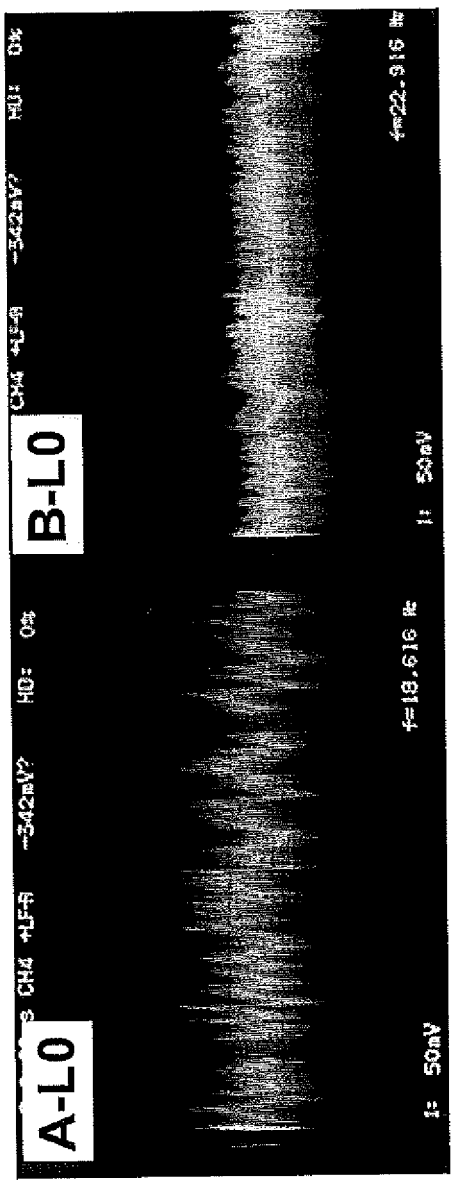
FIG. 14 is a diagram showing the waveforms of recording signals relating to an L0 recording and reading layer in the multilayer optical recording media of Comparative Example A and Example B of the invention.
Figure 15:
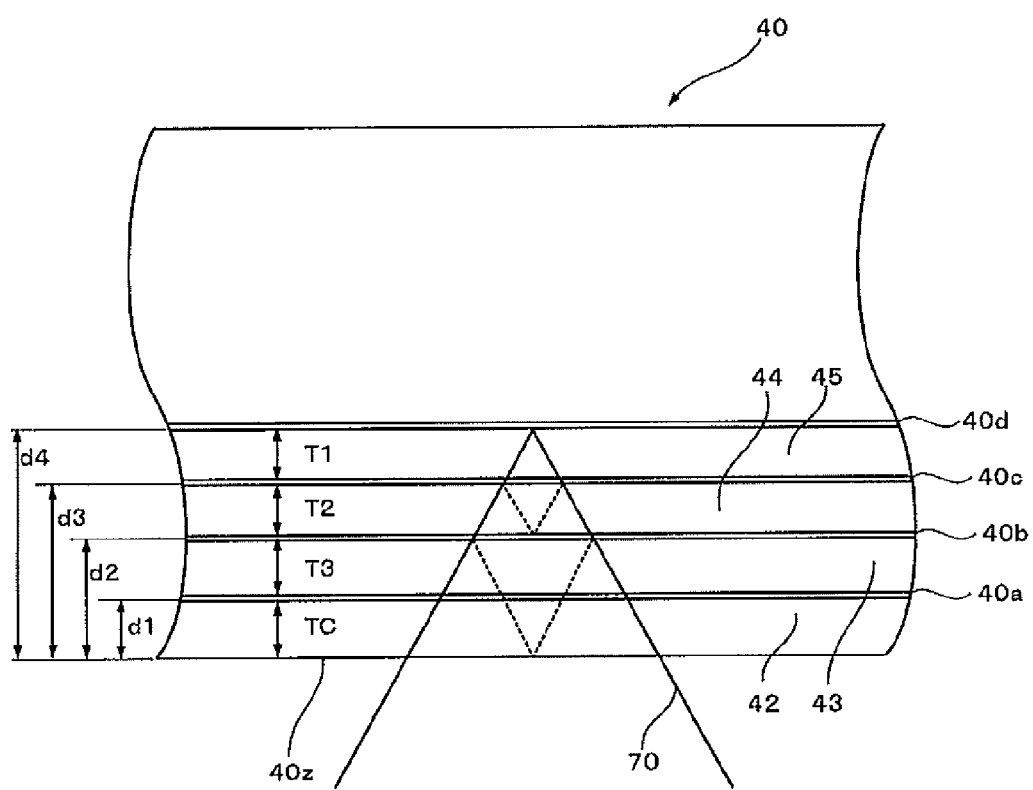
FIG. 15 is a diagram showing the conditions of reading light and stray light in a multilayer optical recording medium.
Figure 16:
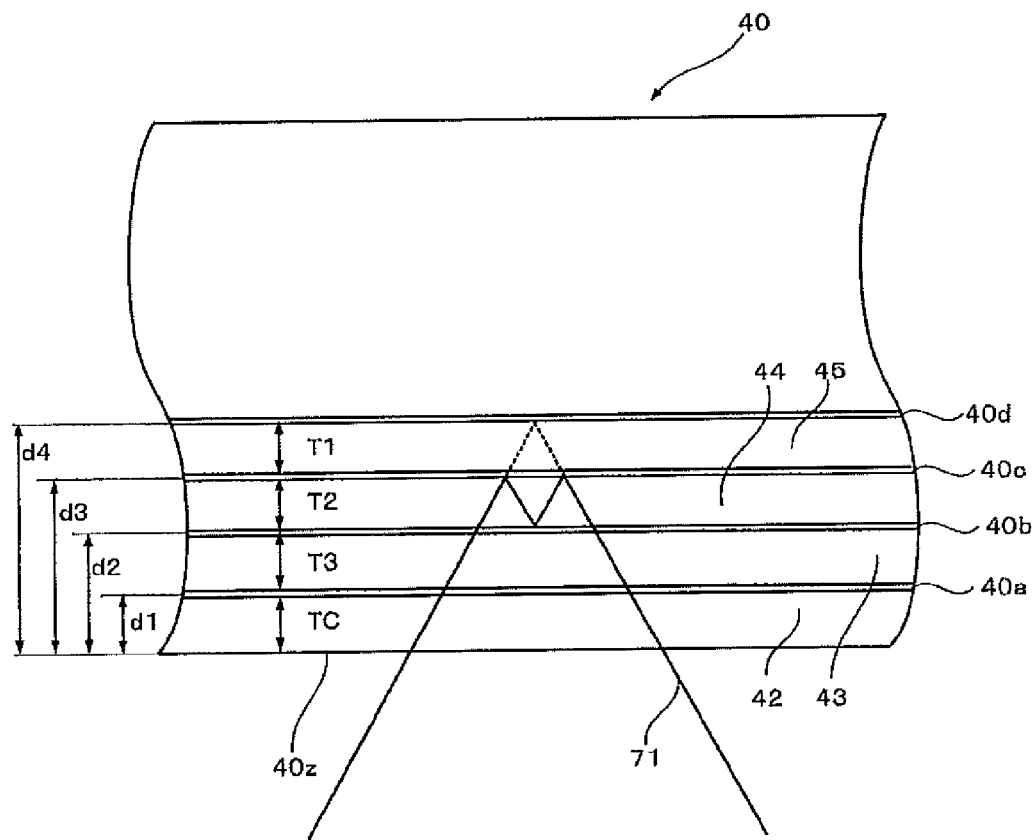
FIG. 16 is a diagram showing the conditions of reading light and stray light in a multilayer optical recording medium.
Figure 17:
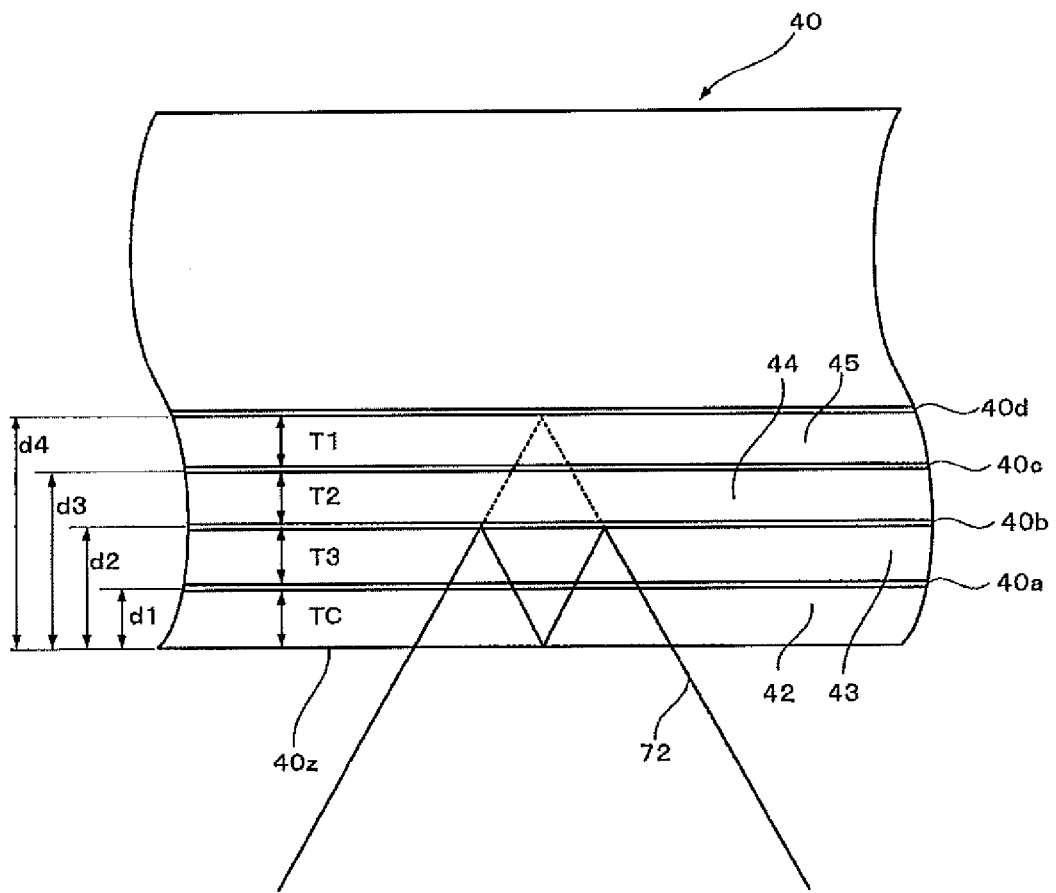
FIG. 17 is a diagram showing the conditions of reading light and stray light in a multilayer optical recording medium.
Figure 18:
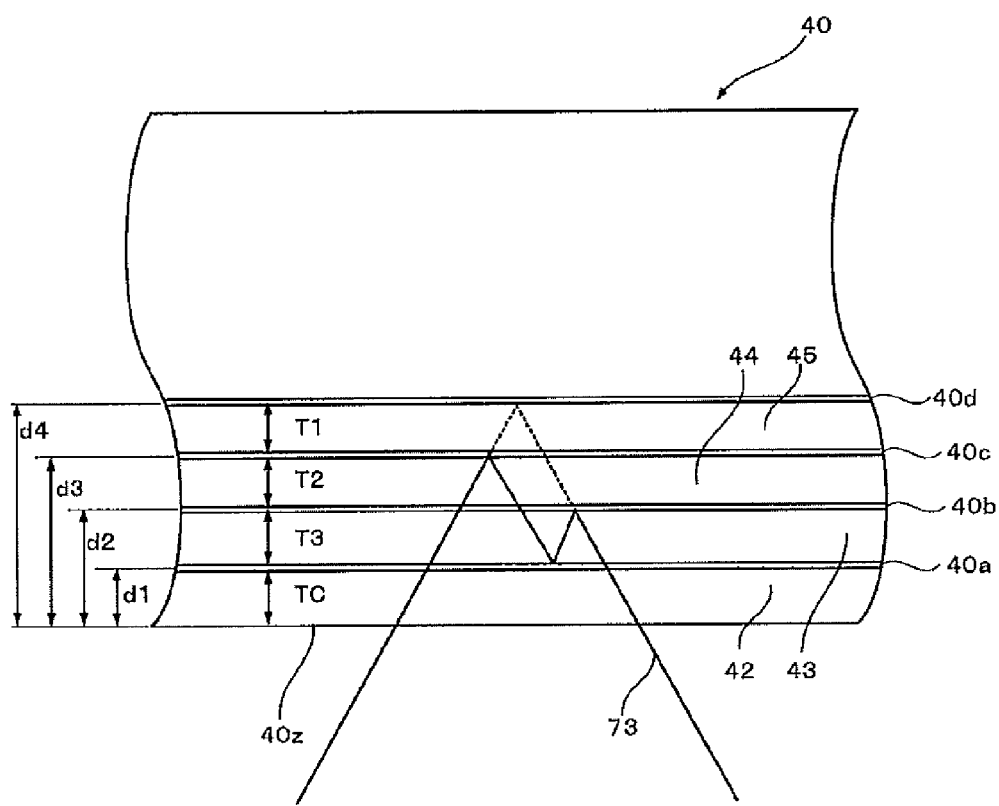
FIG. 18 is a diagram showing the conditions of reading light and stray light in a multilayer optical recording medium.

In each of Example and Comparative Example, recording was made in one cycle to the L0 recording and reading layer 14A nearest the back side in which the confocal crosstalk becomes most influential. FIG. 14 includes photographs of resultant signals.

Figure 13F:
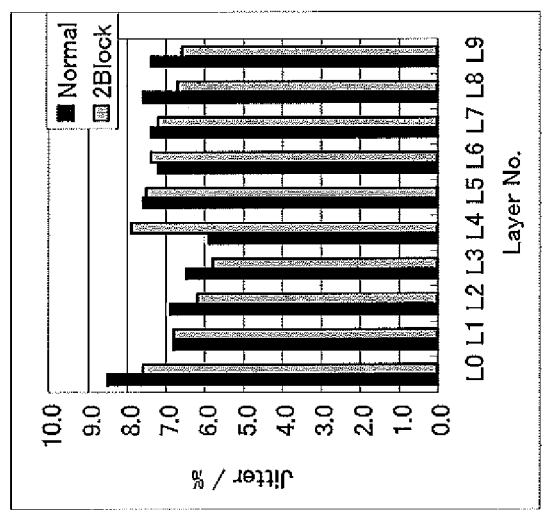

As seen from the photograph (A-L0) relating to Comparative Example, significant fluctuations of a reflectance due to the confocal crosstalk are observed in the recording signal of one cycle. With reference to FIG. 13F, the graph can show degradation of jitter characteristics of the L0 recording and reading layer 14A in Comparative Example.

In contrast, it is seen from the photograph (B-L0) of the L0 recording and reading layer 14A relating to Example that the fluctuations of a reflectance such as those observed in Comparative Example are considerably reduced. With reference to FIG. 13F and FIG. 13E, the graph can clearly show the fact that jitter characteristics are improved with the same reading power despite a smaller amount of reflected light returning to the photodetector 732.

In the embodiments described above, 10 to 20 recording and reading layers are prepared, and two or three groups each including recording and reading layers of the same characteristics are formed. However, the invention is not limited thereto. A burden on designing a structure with six or more recording and reading layers is significantly reduced if the invention is applied to the structure. A burden on designing a structure with eight or more recording and reading layers is more significantly reduced. In this case, the number of stacked layers can be increased if at least one group of recording and reading layers (specifically a group nearest the light incident surface) has four or more recording and reading layers. It is preferable that at least two groups of recording and reading layers (specifically a group nearest the light incident surface and a group second nearest the light incident surface) both have two or more recording and reading layers. It is more preferable that at least two groups of recording and reading layers (specifically a group nearest the light incident surface and a group second nearest the light incident surface) both have three or more recording and reading layers.

The invention allows increase of the number of stacked recording and reading layers as long as limitations of an evaluation unit such as a range of spherical aberration correction and laser power permit. The invention also allows increase of the number of the recording and reading layer groups to four or more depending on the limitations of the evaluation unit.

The embodiments employ intermediate layers of two film thicknesses. However, the invention is not limited thereto. The thicknesses of intermediate layers may suitably be determined. As an example, the film thicknesses of intermediate layers may not be set alternately, but the intermediate layers may have the same film thickness in one recording and reading layer group (see the fifth embodiment) as long as the effect of the fluctuations of a reflectance falls within an allowable range of the evaluation unit. It is preferable still in this case that only an intermediate layer at a change point between recording and reading layer groups have a greater film thickness in order to reduce the effect of interlayer stray light at the change point. Intermediate layers may have a plurality of film thicknesses. It is preferable in this case that the maximum film thickness be employed as the thickness of an intermediate layer to be disposed between recording and reading layer groups.

Further, recording and reading layers may be divided into three or more groups while intermediate layers of two types of film thicknesses are alternately disposed. In this case, as described regarding the fourth embodiment, it is preferable that at least a recording and reading layer group, which is a second nearest group with respect to the light incident surface or farther from the light incident surface than the second nearest group and which is not a group farthest from the light incident surface, have an even number of recording and reading layers. The reason therefor is that this setting makes it possible to always dispose an intermediate layer of a greater film thickness at a change point between recording and reading layer groups.

The multilayer optical recording medium is not limited to those of the embodiments described above. Various modifications are certainly applicable without departing from the gist of the present invention.

The multilayer optical recording medium of the present invention is applicable as optical multilayer optical recording media in accordance with various standards.

The entire disclosure of Japanese Patent Application No. 2010-236073 filed on Oct. 21, 2010 including specification, claims, drawings, and summary are incorporated herein by reference in its entirety.

What is claimed is:

1. A multilayer optical recording medium with at least six or more recording and reading layers disposed one above the other with intermediate layers interposed therebetween, wherein information can be read by light irradiation, the multilayer optical recording medium comprising at least two or more recording and reading layer groups each including the plurality of recording and reading layers successively disposed one above the other in an order in which the layers are stacked so that reflectance of each of the recording and reading layers in a stacked state in each of the groups decreases in the order from a front side near a light incident surface toward a back side far from the light incident surface, wherein regarding the recording and reading layer groups adjacent to each other with any of the intermediate layers interposed therebetween, a recording and reading layer nearest the front side among the recording and reading layers in the recording and reading layer group nearer the back side has a reflectance in a stacked state higher than that of a recording and reading layer nearest the back side among the recording and reading layers in the recording and reading layer group nearer the front side.

2. The multilayer optical recording medium according to claim 1, wherein the intermediate layer disposed between the adjacent recording and reading layer groups has a film thickness greater than those of two intermediate layers that are adjacent to recording and reading layers disposed on both sides of the intermediate layer between the two groups.

3. The multilayer optical recording medium according to claim 1, wherein a plurality of film thicknesses are set for the intermediate layers, and the intermediate layer disposed between the adjacent recording and reading layer groups has a maximum film thickness of the plurality of film thicknesses.

4. The multilayer optical recording medium according to claim 1, wherein the intermediate layers disposed in the recording and reading layer groups have substantially the same film thickness in each of the recording and reading layer groups.

5. The multilayer optical recording medium according to claim 3, wherein the intermediate layers disposed in the recording and reading layer groups have substantially the same film thickness in each of the recording and reading layer groups.

6. The multilayer optical recording medium according to claim 1, wherein the intermediate layers include a first intermediate layer having a first film thickness and a second intermediate layer having a second film thickness greater than the first film thickness, the first and second intermediate layers being alternately disposed one above the other with the recording and reading layer interposed therebetween.

7. The multilayer optical recording medium according to claim 3, wherein the intermediate layers include a first intermediate layer having a first film thickness and a second intermediate layer having a second film thickness greater than the first film thickness, the first and second intermediate layers being alternately disposed one above the other with the recording and reading layer interposed therebetween.

8. The multilayer optical recording medium according to claim 4, wherein the intermediate layers include a first intermediate layer having a first film thickness and a second intermediate layer having a second film thickness greater than the first film thickness, the first and second intermediate layers being alternately disposed one above the other with the recording and reading layer interposed therebetween.

9. The multilayer optical recording medium according to claim 6, wherein the second intermediate layer is disposed between the adjacent recording and reading layer groups.

10. The multilayer optical recording medium according to claim 1, comprising three or more of the recording and reading layer groups, and wherein the recording and reading layer group(s) except the recording and reading layer group nearest the front side and the recording and reading layer group nearest the back side has(have) an even number of the recording and reading layers.

11. The multilayer optical recording medium according to claim 3, comprising three or more of the recording and reading layer groups, and wherein
the recording and reading layer group(s) except the recording and reading layer group nearest the front side and the recording and reading layer group nearest the back side has(have) an even number of the recording and reading layers.

12. The multilayer optical recording medium according to claim 4, comprising three or more of the recording and reading layer groups, and wherein
the recording and reading layer group(s) except the recording and reading layer group nearest the front side and the recording and reading layer group nearest the back side has(have) an even number of the recording and reading layers.

13. The multilayer optical recording medium according to claim 1, comprising two of the recording and reading layer groups.

14. The multilayer optical recording medium according to claim 3, comprising two of the recording and reading layer groups.

15. The multilayer optical recording medium according to claim 4, comprising two of the recording and reading layer groups.

16. The multilayer optical recording medium according to claim 1, wherein at least one of the recording and reading layer groups includes four or more of the recording and reading layers.

17. The multilayer optical recording medium according to claim 3, wherein at least one of the recording and reading layer groups includes four or more of the recording and reading layers.

18. The multilayer optical recording medium according to claim 1, wherein the number of the recording and reading layers forming the farthest one of the recording and reading layer groups from the light incident surface is four or smaller.

19. The multilayer optical recording medium according to claim 3, wherein the number of the recording and reading layers forming the farthest one of the recording and reading layer groups from the light incident surface is four or smaller.

20. The multilayer optical recording medium according to claim 1, comprising at least eight or more of the recording and reading layers.

* * * * *